United States Patent
Sakuma et al.

(10) Patent No.: US 12,473,452 B2
(45) Date of Patent: Nov. 18, 2025

(54) REACTION SOLUTION FOR PIGMENT PRINTING, INK SET, AND RECORDING METHOD

(71) Applicant: SEIKO EPSON CORPORATION, Tokyo (JP)

(72) Inventors: Daisuke Sakuma, Minowa (JP); Akiko Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 190 days.

(21) Appl. No.: 18/177,201

(22) Filed: Mar. 2, 2023

(65) Prior Publication Data
US 2023/0323149 A1 Oct. 12, 2023

(30) Foreign Application Priority Data
Mar. 3, 2022 (JP) .................. 2022-032775

(51) Int. Cl.
*C09D 11/54* (2014.01)
*C09D 11/40* (2014.01)

(52) U.S. Cl.
CPC .............. *C09D 11/54* (2013.01); *C09D 11/40* (2013.01)

(58) Field of Classification Search
CPC ...... C09D 5/033; C09D 11/322; C09D 11/40; C09D 11/38; C09D 11/54; C09D 11/30; A61K 2800/43; A61K 2800/5424; A61K 8/29; A61K 8/14; B41J 2/2114; B41J 2/2107; B41J 2/16552; D21H 23/48; B41M 5/0017; B41M 5/5218; C08F 222/1006
See application file for complete search history.

(56) References Cited

U.S. PATENT DOCUMENTS

| | | | |
|---|---|---|---|
| 2002/0041854 A1* | 4/2002 | Hadasch | A61Q 1/12 424/63 |
| 2003/0069329 A1 | 4/2003 | Kubota et al. | |
| 2003/0100646 A1* | 5/2003 | Anchor | C09D 5/033 524/323 |
| 2004/0196351 A1* | 10/2004 | Kida | B41M 5/0011 347/105 |
| 2008/0317963 A1* | 12/2008 | Barcock | B05D 1/305 427/420 |
| 2009/0053409 A1* | 2/2009 | Yamamoto | B41M 5/502 427/195 |
| 2011/0001779 A1* | 1/2011 | Kida | B41J 2/2114 347/42 |
| 2011/0227990 A1* | 9/2011 | Kuwabara | C09D 5/022 524/592 |
| 2014/0118449 A1* | 5/2014 | Sarkisian | B41J 2/2114 524/436 |

(Continued)

FOREIGN PATENT DOCUMENTS

| | | |
|---|---|---|
| CN | 110093793 A | 8/2019 |
| JP | 2016-089288 A | 5/2016 |
| WO | 2021-201873 A1 | 10/2021 |

*Primary Examiner* — John P Zimmermann
(74) *Attorney, Agent, or Firm* — Harness, Dickey & Pierce, P.L.C.

(57) ABSTRACT

A reaction solution for pigment printing according to an embodiment of the present disclosure contains a polyvalent metal salt, a cationic polymer, a polyhydric alcohol having a standard boiling point of 250° C. or higher, and water, and is used by being ejected by an ink jet method.

14 Claims, 4 Drawing Sheets

(56) References Cited

U.S. PATENT DOCUMENTS

| | | | |
|---|---|---|---|
| 2015/0114246 A1* | 4/2015 | Chopra | C08K 5/45 |
| | | | 101/483 |
| 2017/0156994 A1* | 6/2017 | Lingoes | A61K 8/29 |
| 2019/0001684 A1* | 1/2019 | Okuda | B41J 2/16508 |
| 2019/0234015 A1 | 8/2019 | Chidate et al. | |
| 2021/0155816 A1* | 5/2021 | Nasu | A61K 8/29 |
| 2021/0301167 A1 | 9/2021 | Okada et al. | |

\* cited by examiner

REACTION SOLUTION FOR PIGMENT PRINTING, INK SET, AND RECORDING METHOD

The present application is based on, and claims priority from JP Application Serial Number 2022-032775, filed Mar. 3, 2022, the disclosure of which is hereby incorporated by reference herein in its entirety.

BACKGROUND

1. Technical Field

The present disclosure relates to a reaction solution for pigment printing, an ink set, and a recording method.

2. Related Art

In the related art, when dyeing is performed on a base material such as a fabric with a coloring material such as a pigment by an ink jet method to produce a printed matter, in order to improve color developing properties of the coloring material, a technique of performing pretreatment on a base material using a reaction solution containing a cationic compound or the like was known. Among these, in a recording method in which a pretreatment and an ink adhering step are performed by one recording apparatus, an examination on a reaction solution ejected by an ink jet method is performed.

For example, according to JP-A-2016-089288, in printing using an ink composition containing a pigment (pigment printing), a pretreatment solution containing a polyvalent metal compound applicable to a wet-on-wet type recording method performing steps from a step of adhering a pretreatment solution to a step of adhering an ink without going through a drying step is disclosed.

However, the reaction solution for pigment printing used by being ejected by an ink jet method had problems in which color developing properties, friction fastness, and intermittent printing stability are deteriorated.

SUMMARY

An aspect of a reaction solution for pigment printing according to the present disclosure includes
  a polyvalent metal salt;
  a cationic polymer;
  a polyhydric alcohol having a standard boiling point of 250° C. or higher; and water, and
  is used by being ejected by an ink jet method.

An aspect of an ink set according to the present disclosure includes
  a printing ink jet ink composition containing a pigment, resin particles, and water; and
  the reaction solution for pigment printing according to the above-mentioned aspect.

An aspect of a recording method according to the present disclosure includes
  an ink adhering step of adhering an ink composition to a fabric by an ink jet method; and
  a reaction solution adhering step of adhering the reaction solution for pigment printing of the above-mentioned aspect to the fabric by an ink jet method.

DESCRIPTION OF EXEMPLARY EMBODIMENTS

Figure 1:
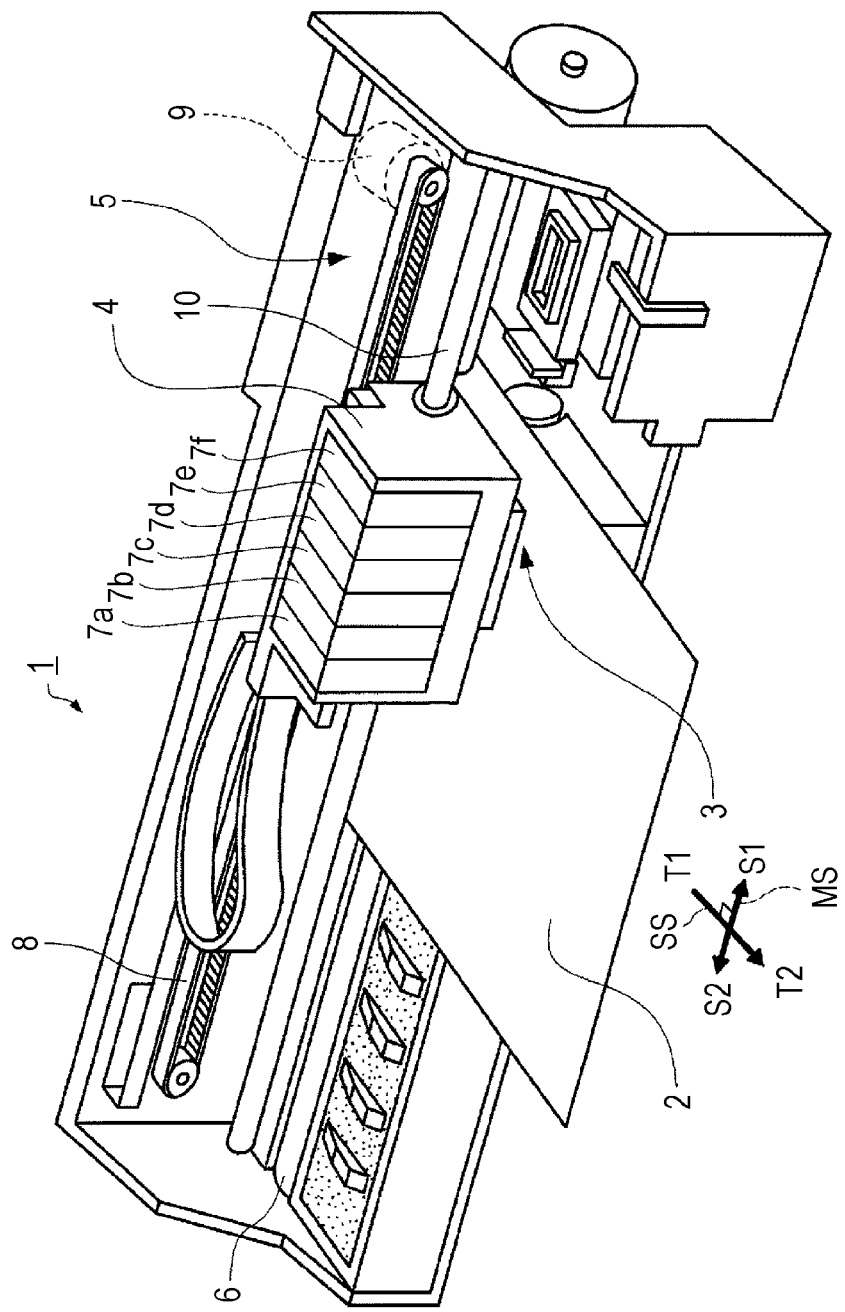
FIG. 1 is a schematic perspective view of an ink jet printing apparatus applicable to the recording method according to the present embodiment.

Hereinafter, embodiments of the present disclosure will be described. The embodiments described below describe examples of the present disclosure. The present disclosure is not limited to the following embodiments, and includes various modifications implemented within a range not changing the gist of the present disclosure. It should be noted that not all of the configurations described below are essential configurations of the present disclosure.

1. Reaction Solution for Pigment Printing

A reaction solution for pigment printing according to an embodiment of the present disclosure contains a polyvalent metal salt, a cationic polymer, a polyhydric alcohol having a standard boiling point of 250° C. or higher, and water, and is used by being ejected by an ink jet method.

In the related art, when dyeing is performed on a base material such as a fabric with a coloring material such as a pigment by an ink jet method to produce a printed matter, in order to improve color developing properties of the coloring material, a technique of performing pretreatment on a base material using a reaction solution containing a cationic compound or the like has been known. The pretreatment in ink jet pigment printing is usually performed by a dipping method or the like using a separate apparatus/equipment. However, in such a method, it is not only necessary to use a separate apparatus/equipment, but also steps become complicated or know-how is required by using the separate apparatus/equipment. In addition, since waste liquid is discharged, the method is not preferable from a viewpoint of environmental load.

Therefore, in ink jet pigment printing, examination is performed on which not only an ink composition but also a reaction solution are ejected by an ink jet method. In such an aspect, it is not necessary to use a separate apparatus/equipment, the steps become simplified, and it is possible not to discharge waste liquid.

However, although a reaction solution containing only a polyvalent metal salt can aggregate ink in the vicinity of a surface of the fabric to make color developing properties favorable, there is a problem in which the ink stays in the vicinity of the surface of the fabric and friction fastness (in particular, wet friction fastness) is easily deteriorated. Therefore, it was found that by causing the reaction solution to further contain a cationic polymer, it is possible to impart water resistance to the fabric and make friction fastness (in particular, wet friction fastness) favorable. On the other hand, when a cationic polymer is contained, there occurred a new problem in which high viscosity is easily caused when an amount of water volatilized from the reaction solution is small, and ejection stability (intermittent printing stability) is easily deteriorated when the ink jet method is applied.

Therefore, as a result of further intensive examination by the present inventors, it was found that by further containing a polyhydric alcohol having a standard boiling point of 250° C. or higher, ejection stability (intermittent printing stability) can be improved even when a cationic polymer is contained. That is, according to the reaction solution for pigment printing according to the present embodiment, it is possible to improve color developing properties, friction fastness, and intermittent printing stability.

1.1 Application

A reaction solution for pigment printing according to the present embodiment is used by being ejected by an ink jet method.

For example, "pigment printing" means those used in printing performed by using an ink composition containing a pigment.

"Ink jet method" is a recording method in which droplets of ink, a reaction solution, or the like are ejected from a nozzle of an ink jet head of an ink jet recording apparatus or the like and applied to a recording medium.

Since the reaction solution for pigment printing according to the present embodiment is used by being ejected by an ink jet method, unlike pretreatment in the related art, it is not necessary to use a separate apparatus/equipment, steps become simplified, and it is possible not to discharge waste liquid. In addition, by applying the reaction solution by the ink jet method, an image is less likely to bleed even when an amount of the reaction solution applied is large, as compared with the case in which the reaction solution is applied by a spray or the like, not by the ink jet method. It is presumed that this is because, when applying the reaction solution by the ink jet method, the ejection amount can be controlled to be small and the ink can be in immediate contact with the ink by the wet-on-wet method, and thus the reaction between the reaction solution and the ink easily proceeds. On the other hand, when applying the reaction solution by a spray or the like, not by the ink jet method, it is difficult to control the ejection amount to be small, and the ink and the reaction solution do not come into immediate contact with each other by a wet-on-wet method after going through a normal drying step, and thus reaction between the reaction solution and the ink was deteriorated. That is, after a large amount of the reaction solution is applied to the fabric by a spray or the like and dried, caused by the fact that the reaction solution itself permeates the inside of the fabric, or the fact that reaction between components of the reaction solution after drying and the ink is solid/liquid reaction, or the fact that an aggregation effect of the ink of the cationic polymer is low, the ink that lands afterwards does not immediately aggregate, and permeation or bleeding of the ink occurs.

The reaction solution is not an ink composition used for performing coloring on the fabric, but an auxiliary solution used together with the ink composition. In addition, the reaction solution preferably aggregates or thickens the components of the ink composition, and more preferably contains a component that aggregates or thickens the components of the ink composition. The reaction solution may contain a coloring material, but may be 0.2% by mass or less, more preferably 0.1% by mass or less, and further more preferably 0.05% by mass or less with respect to a total mass of the reaction solution, and a lower limit is 0% by mass. The reaction solution does not preferably contain a coloring material.

Hereinafter, each component contained in the reaction solution for pigment printing according to the present embodiment will be described.

1.2 Polyvalent Metal Salt

The reaction solution for pigment printing according to the present embodiment contains a polyvalent metal salt.

The polyvalent metal salt is excellent in an action of aggregating the components of the ink composition when being in contact with the ink composition, and can aggregate the ink in the vicinity of the surface of the fabric to make color developing properties favorable.

The polyvalent metal salt is a compound formed of a divalent or higher metal ion and an anion. Examples of the divalent or higher metal ion include ions such as calcium, magnesium, copper, nickel, zinc, barium, aluminum, titanium, strontium, chromium, cobalt, and iron. Among the metal ions constituting these polyvalent metal salts, the metal ion is preferably at least one of calcium ion and magnesium ion from the viewpoint of excellent aggregating properties of the components of the ink. In addition, the metal ions are preferably magnesium ions from the viewpoint of a balance between aggregating properties and friction fastness.

The anion constituting the polyvalent metal salt is an inorganic ion or an organic ion. That is, the polyvalent metal salt in the present specification is formed of inorganic ions or organic ions and polyvalent metals. Examples of such inorganic ions include chloride ion, bromine ion, iodine ion, nitrate ion, sulfate ion, hydroxide ion, and the like. Examples of the organic ion include an organic acid ion, and examples thereof include a carboxylic acid ion.

The polyvalent metal salt is preferably a magnesium salt. For example, when the polyvalent metal salt is a calcium salt, the aggregating properties are excellent, but there is a case in which the aggregation reaction is difficult to control, and friction fastness or graininess on the fabric is deteriorated. On the other hand, the magnesium salt exhibits a gentle aggregation reaction with ink as compared with other salts such as a calcium salt, and thus the reaction can be easily controlled. Therefore, there is a tendency that color developing properties can be favorable, and also friction fastness or graininess can be favorable. A counterion of the polyvalent metal may be either an inorganic acid ion or an organic acid ion.

Specific examples of the polyvalent metal salt are not particularly limited, but include calcium carbonate such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, and the like. These polyvalent metal salts may be used alone, or may be used in combination of two or more. Among these, the polyvalent metal salt is preferably one or more selected from magnesium chloride, magnesium sulfate, magnesium carbonate, magnesium silicate, and magnesium acetate from the viewpoint that color developing properties can be favorable, and friction fastness or graininess can also be favorable. In addition, these metal salts may have hydration water in the form of a raw material.

A lower limit of a content of the polyvalent metal salt is preferably 0.5% by mass or more, more preferably 1.0% by mass or more, further more preferably 1.5% by mass or more, particularly preferably 2.0% by mass or more, and more particularly preferably 2.5% by mass or more with respect to a total mass of the reaction solution. In addition, an upper limit of the content of the polyvalent metal salt is preferably 10% by mass or less, more preferably 8% by mass or less, further more preferably 6% by mass or less, even more preferably 5% by mass or less, particularly preferably 4% by mass or less, and more particularly preferably 3.5% by mass or less with respect to the total mass of the reaction solution. When the content of the polyvalent metal salt is within the above-mentioned range, there is a tendency that color developing properties and friction fastness can be well-balanced and favorable.

1.3 Cationic Polymer

The reaction solution for pigment printing according to the present embodiment contains a cationic polymer. By containing the cationic polymer, it is possible to impart water resistance to the fabric, and improve friction fastness (in particular, wet friction fastness).

The cationic polymer means a polymer having cationic properties. Examples of the cationic polymer include a cationic urethane-based resin, a cationic olefin-based resin, a cationic amine-based resin, and the like. Among these, the cationic polymer is preferably a cationic amine-based resin.

Commercially available products can be used as the cationic urethane-based resin, and for example, Hydran CP-7010, CP-7020, CP-7030, CP-7040, CP-7050, CP-7060, CP-7610 (product name, manufactured by DIC Corporation), Superflex 600, 610, 620, 630, 640, 650 (product name, manufactured by DKS Co., Ltd.), urethane emulsion WBR-2120C, WBR-2122C (product name, Taisei Fine Chemical Co., Ltd.), and the like can be used.

The cationic olefin-based resin is a resin having an olefin such as ethylene and propylene in the structural skeleton, and known ones can be appropriately selected and used. In addition, the cationic olefin-based resin may be in an emulsion state of being dispersed in a solvent containing water, an organic solvent, or the like. As the cationic olefin-based resin, a commercially available product can be used, and examples thereof include arrow base CB-1200 and CD-1200 (product name, manufactured by Unitika Ltd.).

As the cationic amine-based resin, known ones can be appropriately selected and used, and, in the structure, the cationic amine-based resin preferably has a cationic functional group selected from a primary amine group, a secondary amine group, a tertiary amine group, a quaternary ammonium base, an imino group, and an amide group, and may particularly have a quaternary ammonium base as the cationic functional group. Such a cationic amine-based resin tends to be more excellent in color developing properties. In addition, the cationic amine-based resin may have two or more of the above-mentioned cationic functional groups.

Examples of the cationic amine-based resin having a primary amine group include polyallylamine, polyallylamine hydrochloride, polyallylamineamide sulfate, methoxycarbonylated allylamine polymer, methylcarbonylated allylamine acetate polymer, a ureated polyallylamine polymer, a carboxylmethylated polyallylamine polymer, a hexamethylenediamine/epichlorohydrin resin, and the like.

Commercially available products can also be used as the cationic amine-based resin having a primary amine group, and examples thereof include PAA-01, PAA-03, PAA-05, PAA-08, PAA-15C, PAA-25; PAA-HCL-01, PAA-HCL-03, PAA-HCL-05, PAA-HCL-3L, PAA-HCL-10L; PAA-SA; PAA-U5000, PAA-U7030; PAA-AC5050A; PAA-N5000, PAA-N5050CL; PAA-CB-1 (manufactured by Nittobo Medical Co., Ltd.), Unisense KHE103L (manufactured by Senka Co., Ltd.), and the like.

Examples of the cationic amine-based resin having a secondary amine group include a diallylamine polymer, a diallylamine hydrochloride polymer, a diallylamine hydrochloride/sulfur dioxide copolymer, a diallylamine acetate/sulfur dioxide copolymer, a diallylamine hydrochloride/acrylamide copolymer, a dimethylamine/epichlorohydrin resin, a dimethylamine/ammonia/epichlorohydrin resin, a dimethylamine/ethylenediamine/epichlorohydrin polymer, and the like.

Commercially available products can also be used as the cationic amine-based resin having a secondary amine group, and examples thereof include PAS-21; PAS-21CL; PAS-92; PAS-92A; PAS-2141CL (manufactured by Nittobo Medical Co., Ltd.), Unisense KHE104L; Unisense KHE100L (manufactured by Senka Co., Ltd.), Catiomaster PE-30 (manufactured by Yokkaichi Chemical Co., Ltd.), and the like.

Examples of the cationic amine-based resin having a tertiary amine group include a methyldiallylamine hydrochloride polymer, a methyldiallylamineamide sulfate polymer, a methyldialylamine acetate polymer, a methyldiallylamine hydrochloride/sulfur dioxide copolymer, a dicyandiamide/polyalkylene polyamine polycondensate, and the like.

Commercially available products can also be used as the cationic amine-based resin having a tertiary amine group, and examples thereof include PAS-M-1L, PAS-M-1; PAS-22SA-40; PAS-M-1A; PAS-2201CL (manufactured by Nittobo Medical Co., Ltd.), Unisense KHP10L (manufactured by Senka Co., Ltd.), and the like.

In addition, examples of commercially available products of a cationic amine-based resin having a primary amine group, a secondary amine group, or a tertiary amine group include Sparamine C-305 (manufactured by Toho Chemical Industries, Ltd.), Alafix 255, 251S (manufactured by Arakawa Chemical Co., Ltd.), Jetfix 38A, 220, 260, N700, 90X (manufactured by Satoda Chemical Industrial Co., Ltd.), WS4020, WS4030, WS4027, PA6646, DK6854 (manufactured by Seiko PMC Corporation), and the like.

Examples of the cationic amine-based resin having a quaternary ammonium base include a diallyldimethylammonium chloride polymer, a diallylmethylethylammonium ethylsulfate polymer, a diallylmethylethylammonium ethylsulfate/sulfur dioxide copolymer, a diallyldimethylammonium chloride/sulfur dioxide copolymer, a diallyldimethylammonium chloride/acrylamide copolymer, and the like.

Commercially available products can also be used as the cationic amine-based resin having a quaternary ammonium base, and examples thereof include PAS-H-1L, PAS-H-5L, PAS-H-10L; PAS-24; PAS-2401; PAS-A-1, PAS-A-5; PAS-J-81L, PAS-J-81, PAS-J-41 (manufactured by Nittobo Medical Co., Ltd.), EP-1137 (manufactured by Takamatsu Oil & Fat Co., Ltd.), Papiogen P-105, Milliogen P-20, Unisense FPA100L, Unisense KHE107L (manufactured by Senka Co., Ltd.), and the like.

Examples of the cationic amine-based resin having an imino group include polyethyleneimine, octadecylisocyanate-modified polyethyleneimine, propylene oxide-modified polyethyleneimine, and the like.

Commercially available products can also be used as the cationic amine-based resin having an imino group, and examples thereof include SP-003, SP-006, SP-012, SP-018, SP-200, HM-2000, P-1000, P-3000; RP-20; PP-061 (manufactured by Nippon Catalyst Co., Ltd.), Lupasol (manufactured by BASF Corporation), and the like.

Examples of the cationic amine-based resin having an amide group include polyamide, polyamide epoxy resin, and the like. Examples of commercially available products of a cationic amine-based resin having an amide group include Sumirez Resin 633, 630(30), 675A, 6615, 6725, SLX-1 (manufactured by Taoka Chemical Co, Ltd.), and the like.

In addition, as the cationic amine-based resin having two or more of cationic functional groups, the following ones are exemplified.

Examples of the cationic amine-based resin having a primary amine group and a secondary amine group include an allylamine/diallylamine copolymer, and an allylamine acetate/diallylamine acetate copolymer, and examples of the commercially available products thereof include PAA-D11; PAA-D19A (manufactured by Nittobo Medical Co., Ltd.), and the like.

Examples of the cationic amine-based resin having a primary amine group and a quaternary ammonium base include an allylamine-diallyldimethylammonium chloride copolymer, and examples of commercially available products thereof include PAA-1123 (manufactured by Nittobo Medical Co., Ltd.) and the like.

Examples of the cationic amine-based resin having a tertiary amine group and a quaternary ammonium base include a methyl diallylamine/diallyldimethylammonium chloride copolymer and a diallyldimethylammonium chloride/3-chloro-2-hydroxypropylated diallylamine hydrochloride copolymer, and examples of the commercially available products thereof include PAA-2223; PAS-880 (manufactured by Nittobo Medical Co., Ltd.), and the like.

A cationic polymer may be used alone, or may be used in combination of two or more.

In addition, the cationic polymer preferably has a structure derived from epihalohydrin. Epihalohydrin is a monomer having an epoxy group and a halogeno group. Examples of the halogeno group include a fluoro group, a chloro group, a bromo group, an iodine group, an astato group, and the like. The epihalohydrin is more preferably epichlorohydrin, in which the halogeno group is a chloro group. When the cationic polymer has a structure derived from epihalohydrin, the epoxy group or the like remaining unreacted among the epihalohydrin can contribute to the crosslinking reaction as a crosslinking group. That is, with this, there is a tendency that the ink is more easily thickened/aggregated, color developing properties can be further improved, and more favorable friction fastness can be obtained since an ink layer is toughened by crosslinking. In addition, when the fabric is cotton or the like, there is a tendency that crosslinking reaction occurs between the crosslinking group derived from epihalohydrin and a hydroxyl group of cellulose of cotton, adhesive properties between the fabric and the ink layer are further improved, and more favorable friction fastness can be obtained.

The cationic polymer having a structure derived from epihalohydrin is more preferably a cationic amine-based resin having a structure derived from epihalohydrin. Examples of such a polymer include a polyamine-epihalohydrin copolymer, a polyamide-epihalohydrin copolymer, a polyamidepolyamine-epihalohydrin copolymer, an amine-epihalohydrin copolymer, and the like.

Commercially available products may be used as the cationic polymer having a structure derived from epihalohydrin, and examples thereof include Kymene 557 (manufactured by SOLENIS Corporation), Milliogen P-20, Unisense KHE107L (Senka Co., Ltd.), WS-4020, 4030, 4027, TS-4070 (manufactured by Seiko PMC Corporation, polyamide-epichlorohydrin polymer), WS-4011 (manufactured by Seiko PMC Corporation, polyamine-epichlorohydrin polymer), AF-100, 251S, 255, 255L0X, 2500 (manufactured by Arakawa Chemical Industries, Ltd., polyamidepolyamine-epichlorohydrin polymer), Cationmaster PE-30 (manufactured by Yokkaichi Chemical Co., Ltd., dimethylamine/ethylenediamine/epichlorohydrin condensate), EPA-SK01 (manufactured by Yokkaichi Chemical Co., Ltd., polyamidepolyamine-epichlorohydrin condensate), and the like.

A mass average molecular weight of the cationic polymer is preferably 100,000 or less, more preferably 80,000 or less, further preferably 60,000 or less, particularly preferably 40,000 or less, and more particularly preferably 20,000 or less. A lower limit of the mass average molecular weight of the cationic polymer is not particularly limited, but is preferably 100 or more, more preferably 1,000 or more, and further more preferably 5,000 or more. When the mass average molecular weight of the cationic polymer is 100,000 or less, there is a tendency that the ejection performance when the reaction solution is applied by the ink jet method becomes more favorable. The mass average molecular weight can be measured using polyethylene glycol as a standard polymer by using gel permeation chromatography (GPC measuring apparatus).

A content of the cationic polymer is preferably 0.5% to 5.0% by mass, more preferably 1.0% to 4.5% by mass, further more preferably 1.5% to 4.0% by mass, and particularly preferably 2.0% to 3.5% by mass with respect to a total amount of the reaction solution. When the content of the cationic polymer is 0.5% by mass or more, friction fastness can be favorable. On the other hand, when the content of the cationic polymer is 5.0% by mass or less, the viscosity of the reaction solution is likely to be suitable for the ink jet method, and the intermittent printing stability can be improved.

1.4 Polyhydric Alcohol

The polyhydric alcohol has one or more hydroxyl groups in the molecule, preferably has two or more hydroxyl groups in the molecule, and more preferably has three or more hydroxyl groups in the molecule. Examples of the polyhydric alcohol include alcohols, alkanediols, polyols, alkylene glycol monoalkyl ethers, and the like. Among these, the polyhydric alcohol is preferably one or more selected from polyols and alkylene glycol monoalkyl ethers, and more preferably polyols. A state of the polyhydric alcohol at room temperature and normal pressure may be a liquid or a solid, but a liquid is preferable.

Examples of alcohols include compounds in which one hydrogen atom of alkane is substituted with a hydroxyl group. The alkane may be a linear type or a branched type. Examples of alcohols include methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

Examples of alkanediols include compounds in which alkane is substituted with two hydroxyl groups. Examples of alkanediols include ethylene glycol (also known as ethane-1,2-diol), propylene glycol (also known as propane-1,2-diol), 1,2-butanediol, 1,2-pentanediol, 1,2-hexanediol, 1,2-octanediol, 1,3-propanediol, 1,3-butylene glycol (also known as 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, 2-methyl-2-propyl-1,3-propanediol, and the like.

Examples of the polyols include a condensate in which two or more molecules of alkanediols are intermolecularly condensed between hydroxyl groups, a compound having three or more hydroxyl groups, and the like.

Examples of condensates in which two or more molecules of alkanediols are intermolecularly condensed between hydroxyl groups include dialkylene glycols such as diethylene glycol and dipropylene glycol, trialkylene glycol such as triethylene glycol (standard boiling point 287° C.) and tripropylene glycol, and the like.

The compound having three or more hydroxyl groups is a compound having three or more hydroxyl groups having an alkane or polyether structure as a skeleton. Examples of the compound having three or more hydroxyl groups include glycerin (standard boiling point 290° C.), trimethylolethane, trimethylolpropane, 1,2,5-hexanetriol, 1,2,6-hexanetriol, pentaerythritol, polyoxypropylenetriol, and the like.

Examples of the alkylene glycol monoalkyl ethers include ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethielene glycol monomethyl ether, triethylene glycol monoethyl ether, triethylene glycol monobutyl ether(BTG, standard boiling point 278° C.), tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether, and the like.

1.4.1 Polyhydric Alcohol Having Standard Boiling Point of 250° C. or Higher

The reaction solution for pigment printing according to the present embodiment contains a polyhydric alcohol having a standard boiling point of 250° C. or higher. With this, moisturizing properties of the reaction solution become favorable, and even when a cationic polymer is contained, ejection stability can be favorable. In addition, from the viewpoint of suppressing the problem of VOC (volatile organic compound), the standard boiling point of the polyhydric alcohol is preferably 250° C. or higher.

Examples of polyhydric alcohols having a standard boiling point of 250° C. or higher include triethylene glycol (standard boiling point of 287° C.), trimethylolpropane (standard boiling point of 295° C.), glycerin (standard boiling point of 290° C.), and the like as polyols having a standard boiling point of 250° C. or higher. Examples of alkylene glycol monoalkyl ethers having a standard boiling point of 250° C. or higher include triethylene glycol monobutyl ether (BTG, standard boiling point 278° C.), triethylene glycol monoethyl ether (standard boiling point 255° C.), tetraethylene glycol monobutyl ether (standard boiling point 290° C. or higher), and the like. Among these, the polyhydric alcohol having a standard boiling point of 250° C. or higher is preferably one or more selected from triethylene glycol, glycerin, and triethylene glycol monobutyl ether, and more preferably glycerin. In the case of the above-mentioned compound, there is a tendency that moisturizing properties become more favorable, and intermittent printing stability becomes more excellent. In addition, from the same viewpoint, the polyhydric alcohol having a standard boiling point of 250° C. or higher preferably has a standard boiling point of 260° C. or higher, more preferably has a standard boiling point of 270° C. or higher, further more preferably has a standard boiling point of 280° C. or higher, and particularly preferably has a standard boiling point of 285° C. or higher.

A content of the polyhydric alcohol having a standard boiling point of 250° C. or higher is not particularly limited, but is preferably 0.5% by mass or more, more preferably 1.0% by mass or more, further more preferably 3.0% by mass or more, even more preferably 5.0% by mass or more, particularly preferably 10% by mass or more, and more particularly preferably 12% by mass or more with respect to the total amount of the reaction solution. An upper limit is not particularly limited, but is preferably 30% by mass or less, more preferably 25% by mass or less, further more preferably 20% by mass or less, even more preferably 18% by mass or less, and particularly preferably 16% by mass or less. When the content of the polyhydric alcohol having a standard boiling point of 250° C. or higher is within the above-mentioned range, there is a tendency that the balance between moisturizing properties and drying properties is excellent, and both intermittent printing stability and friction fastness can be favorable.

1.4.2 Polyhydric Alcohol Having Standard Boiling Point of 230° C. or Less

The reaction solution for pigment printing according to the present embodiment preferably further contains a polyhydric alcohol having a standard boiling point of 230° C. or lower. Since the above-mentioned polyhydric alcohol having a standard boiling point of 250° C. or higher is excellent in moisturizing properties, the solvent is hard to dry and remains on the fabric, with this, the reaction of the cationic polymer is inhibited, and friction fastness may be easily deteriorated. On the other hand, by further containing a polyhydric alcohol having a standard boiling point of 230° C. or lower, the above-mentioned problems are alleviated and the reactivity of the cationic polymer become favorable, and thus friction fastness can become favorable. When only a polyhydric alcohol having a standard boiling point of 230° C. or lower is contained, the moisturizing properties are deteriorated and favorable intermittent printing stability cannot be obtained.

Examples of polyhydric alcohols having a standard boiling point of 230° C. or lower include ethylene glycol (standard boiling point 197° C.), propylene glycol (standard boiling point 188° C.), 1,2-butanediol (standard boiling point 192° C.), 1,2-hexanediol (standard boiling point 223° C.), 1,3-propanediol (standard boiling point 213° C.), 1,3-butylene glycol (standard boiling point 207° C.), 1,4-butanediol (standard boiling point 230° C.), 2-ethyl-2-methyl-1,3-propanediol (standard boiling point 226° C.), 2-methyl-1,3-propanediol (standard boiling point 214° C.), 2,2-dimethyl-1,3-propanediol (standard boiling point 210° C.), 3-methyl-1,3-butanediol (standard boiling point 203° C.), 2-methylpentane-2,4-diol (standard boiling point 197° C.), and the like as alkanediols having a standard boiling point of 230° C. or lower. Examples of alkylene glycol monoalkyl ethers having a standard boiling point of 230° C. or lower include ethylene glycol monomethyl ether (standard boiling point 124° C.), ethylene glycol monoethyl ether (standard boiling point 135° C.), ethylene glycol monoisopropyl ether (standard boiling point 141° C.), ethylene glycol monobutyl ether (standard boiling point 171° C.), diethylene glycol monomethyl ether (standard boiling point 194° C.), diethylene glycol monoethyl ether (standard boiling point 196° C.), propylene glycol monomethyl ether (standard boiling point 121° C.), propylene glycol monoethyl ether (standard boiling point 132° C.), propylene glycol monopropyl ether (standard boiling point 149° C.), propylene glycol monobutyl ether (standard boiling point 170° C.), dipropylene glycol monomethyl ether (standard boiling point 188° C.), dipropylene glycol monopropyl ether (standard boiling point 210° C.), and the like. Among these, the polyhydric alcohol having a standard boiling point of 230° C. or lower is preferably one or more selected from propylene glycol and 1,3-butylene glycol, and more preferably propylene glycol. In the case of the above-mentioned compound, there is a tendency that the inhibition of the reaction of the cationic polymer is further reduced, and friction fastness is more excellent. In addition, from the same viewpoint, the polyhydric alcohol having a standard boiling point of 230° C. or lower is preferably a standard boiling point of 220° C. or lower, more preferably a standard boiling point of 210° C. or lower, further more preferably a standard boiling point of 200° C. or lower, and particularly preferably a standard boiling point of 190° C. or lower.

A content of the polyhydric alcohol having a standard boiling point of 230° C. or lower is not particularly limited, but is preferably 0.5% by mass or more, more preferably 1.0% by mass or more, further more preferably 3.0% by mass or more, even more preferably 5.0% by mass or more, particularly preferably 10% by mass or more, and more particularly preferably 12% by mass or more with respect to the total amount of the reaction solution. An upper limit is not particularly limited, but is preferably 30% by mass or less, more preferably 25% by mass or less, further more preferably 20% by mass or less, even more preferably 18% by mass or less, and particularly preferably 16% by mass or less. When the content of the polyhydric alcohol having a standard boiling point of 230° C. or lower is within the above-mentioned range, there is a tendency that the balance between moisturizing properties and drying properties is excellent, and both intermittent printing stability and friction fastness can be favorable.

1.5 Content Ratio

In the reaction solution for pigment printing according to the present embodiment, when the content of the polyhydric alcohol having a standard boiling point of 250° C. or higher with respect to the total amount of the reaction solution is Mil, and the content of the polyhydric alcohol having a standard boiling point of 230° C. or lower with respect to the total amount of the reaction solution is $M_2$, a content ratio $(M_2/M_1)$ is preferably 0.1 to 30.0. An upper limit of the content ratio $(M_2/M_1)$ is more preferably 25 or less, further more preferably 20 or less, even more preferably 15 or less, particularly preferably 10 or less, and more particularly preferably 5 or less, and even more particularly preferably 3 or less. A lower limit of the content ratio $(M_2/M_1)$ is preferably 0.2 or more, more preferably 0.4 or more, further more preferably 0.6 or more, and particularly preferably 0.8 or more. When the content ratio $(M_2/M_1)$ is within the above-mentioned range, there is a tendency that the balance between moisturizing properties and drying properties is excellent, and both intermittent printing stability and friction fastness can be favorable.

In the reaction solution for pigment printing according to the present embodiment, when the content of the polyhydric alcohol having a standard boiling point of 250° C. or higher with respect to the total amount of the reaction solution is $M_1$ and the content of the cationic polymer with respect to the total amount of the reaction solution is $M_3$, the content ratio $(M_1/M_3)$ is preferably 0.5 to 50.0. An upper limit of the content ratio $(M_1/M_3)$ is preferably 40 or less, more preferably 30 or less, further more preferably 25 or less, even more preferably 20 or less, particularly preferably 15 or less, more particularly preferably 12 or less, and even more particularly preferably 9 or less. A lower limit of the content ratio $(M_1/M_3)$ is preferably 1 or more, more preferably 2 or more, further more preferably 3 or more, even more preferably 4 or more, particularly preferably 5 or more, and more particularly preferably 6 or more. When the content ratio $(M_1/M_3)$ is within the above-mentioned range, there is a tendency that the balance between the reactivity and moisturizing properties of the cationic polymer is excellent, and both intermittent printing stability and friction fastness can be favorable.

In the reaction solution for pigment printing according to the present embodiment, when the content of the cationic polymer with respect to the total amount of the reaction solution is $M_3$ and the content of the polyvalent metal salt with respect to the total amount of the reaction solution is $M_4$, a content ratio $(M_3/M_4)$ is preferably 0.1 to 4.0. An upper limit of the content ratio $(M_3/M_4)$ is preferably 3.0 or less, more preferably 2.0 or less, further more preferably 1.7 or less, even more preferably 1.4 or less, particularly preferably 1.1 or less, and more particularly preferably 0.9 or less. A lower limit of the content ratio $(M_3/M_4)$ is preferably 0.2 or more, more preferably 0.3 or more, further more preferably 0.4 or more, particularly preferably 0.5 or more, and more particularly preferably 0.6 or more. When the content ratio $(M_3/M_4)$ is within the above-mentioned range, there is a case in which the balance among color developing properties, friction fastness, and intermittent printing stability can be favorable.

1.6. Water

The reaction solution for pigment printing according to the present embodiment may contain water. Examples of water include pure water such as ion-exchanged water, ultra-filtered water, reverse osmosis water, and water having reduced ionic impurities such as ultrapure water. In addition, when water sterilized by irradiation with ultraviolet rays or addition of hydrogen peroxide or the like is used, it is possible to suppress generation of bacteria or fungi when the reaction solution is stored for a long period of time.

The water content is preferably 30% by mass or more, more preferably 40% by mass or more, further more preferably 45% by mass or more, even more preferably 50% by mass or more, particularly preferably 55% by mass or more, and more particularly preferably 60% by mass or more with respect to the total amount of the reaction solution. Since the water content is within the above-mentioned range, it is possible to maintain the reaction solution for pigment printing at a relatively low viscosity. In addition, an upper limit of the water content is preferably 90% by mass or less, more preferably 85% by mass or less, and further more preferably 80% by mass or less with respect to the total amount of the reaction solution.

1.7. Organic Solvent

The reaction solution for pigment printing according to the present embodiment may contain an organic solvent other than the polyhydric alcohol. Examples of such an organic solvent include esters, alkylene glycol dialkylethers, cyclic esters, nitrogen-containing solvents, and the like. Examples of the nitrogen-containing solvent include cyclic amides, acyclic amides, and the like. Examples of the acyclic amides include alkoxyalkylamides and the like.

Examples of esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, methoxybutyl acetate; glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, dipropylene glycol acetate propionate, and the like.

Examples of the alkylene glycol dialkyl ethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, tripropylene glycol dimethyl ether, and the like.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone; compounds in which a hydrogen of a methylene group adjacent to the carbonyl group is substituted with an alkyl group having 1 to 4 carbon atoms, and the like.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Examples of cyclic amides include lactams, and examples thereof include pyrrolidones such as 2-pyrrolidone, 1-methyl-2-pyrrolidone, 1-ethyl-2-pyrrolidone, 1-propyl-2-pyrrolidone, 1-butyl-2-pyrrolidone, and the like.

The organic solvent may be used alone, or may be used in combination of two or more.

1.8 Alkaline Compound

The reaction solution for pigment printing according to the present embodiment may contain an alkaline compound. By containing the alkaline compound, the reaction solution can be easily adjusted to a preferable pH (to be described later). With this, there is a tendency that the corrosion of the ink jet head can be reduced. Examples of the alkaline compound include an inorganic alkaline compound and an organic alkaline compound.

Examples of the inorganic alkaline compound include alkaline metal hydroxide or alkaline earth metal hydroxide, alkaline metal carbonate or alkaline earth metal carbonate, alkaline metal phosphate or alkaline earth metal phosphate, and the like.

Examples of alkaline metal hydroxide include lithium hydroxide, sodium hydroxide, potassium hydroxide, and the like. Examples of the alkaline earth metal hydroxide include calcium hydroxide, magnesium hydroxide, and the like. Examples of alkaline metal carbonate include lithium carbonate, lithium hydrogencarbonate, potassium carbonate, potassium hydrogencarbonate, sodium carbonate, sodium hydrogencarbonate, and the like. Examples of the alkaline earth metal carbonate include calcium carbonate and the like. Examples of alkaline metal phosphate include lithium phosphate, potassium phosphate, trisodium phosphate, disodium hydrogen phosphate, and the like. Examples of the alkaline earth metal phosphate include calcium phosphate, calcium hydrogen phosphate, and the like.

Examples of the organic alkaline compound include ammonia, aliphatic amine, aromatic amine, aliphatic ammonium, aromatic ammonium, heterocyclic compound and hydroxide thereof, carbonate, phosphate, and the like. Examples of the organic alkaline compound include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N,N-dimethyl-4-aminopyridine, ammonium carbonate, ammonium hydrogencarbonate, diammonium hydrogephosphate, piperidine, diethanolamine, triethanolamine, triisopropanolamine, morpholin, and modified products thereof, and the like.

When an alkaline compound is contained, an upper limit of the content thereof is preferably 5% by mass or less, more preferably 4% by mass or less, further more preferably 3% by mass or less, particularly preferably 2% by mass or less, and more particularly preferably 1.5% by mass or less with respect to the total amount of the reaction solution. In addition, a lower limit of the content of the alkaline compound is preferably 0.1% by mass or more, more preferably 0.3% by mass or more, further more preferably 0.5% by mass or more, particularly preferably 0.7% by mass or more, and more particularly preferably 0.9% by mass or more with respect to the total amount of the reaction solution. When the content of the alkaline compound is the above-mentioned upper limit or less, there is a tendency that the corrosion of the ink jet head can be favorably reduced, the reactivity of the cation is less likely to be inhibited, and friction fastness can also become favorable. In addition, when the content of the alkaline compound is the above-mentioned lower limit or more, there is a tendency that the corrosion of the ink jet head can be sufficiently reduced.

In the reaction solution for pigment printing according to the present embodiment, when a content of the alkaline compound with respect to the total amount of the reaction solution is $M_5$, and a content of the cationic polymer with respect to the total amount of the reaction solution is $M_3$, a content ratio ($M_5/M_3$) is preferably 0.1 to 1.0. An upper limit of the content ratio ($M_5/M_3$) is preferably 0.9 or less, more preferably 0.8 or less, further more preferably 0.7 or less, and particularly preferably 0.6 or less. A lower limit of the content ratio ($M_5/M_3$) is preferably 0.2 or more, more preferably 0.3 or more, and further more preferably 0.4 or more. When the content ratio ($M_5/M_3$) is within the above-mentioned range, there is a tendency that the balance between friction fastness and corrosion reducing properties of the ink jet head can be more favorable.

1.9 Surfactant

The reaction solution for pigment printing according to the present embodiment may contain a surfactant. The surfactant is not particularly limited, examples thereof include an acetylene glycol-based surfactant, a fluorine-based surfactant, and a silicone-based surfactant, and the surfactant preferably contains at least one of these, and among these, more preferably contains an acetylene glycol-based surfactant.

The acetylene glycol-based surfactant is not particularly limited, and examples thereof include Surfinol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (hereinabove, all product names, manufactured by Air Products Japan Inc.), Orfin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (hereinabove, all product names, manufactured by Nissin Chemical Industry Co., Ltd.), acetylenol E00, E00P, E40, E100 (hereinabove, all product names, manufactured by Kawaken Fine Chemicals Co., Ltd.), and the like.

The silicone-based surfactant is not particularly limited, and examples thereof preferably include a polysiloxane-based compound. The polysiloxane-based compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (hereinabove, all product names, manufactured by BYK Chemie Japan Co., Ltd.), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (hereinabove, all product names, manufactured by Shin-Etsu Chemical Co., Ltd.), and the like.

As the fluorine-based surfactant, a fluorine-modified polymer is preferably used, and specific examples thereof include BYK-340 (product name, manufactured by BYK Chemie Japan Co., Ltd.).

When a surfactant is contained, a content thereof can be 0.1% by mass or more and 1.5% by mass or less with respect to the total amount of the reaction solution, and is preferably 0.5% by mass or more and 1% by mass or less.

1.10 Metal Sealing Agent

The reaction solution for pigment printing according to the present embodiment may contain a metal sealing agent. The metal sealing agent can remove predetermined ions in the reaction solution.

Examples of the metal sealing agent include ethylenediamine tetraacetic acid such as EDTA, EDTA-2Na (ethylenediamine tetraacetate dihydrogen disodium salt), EDTA-3Na (ethylenediamine tetraacetate monohydrogen trisodium salt), EDTA-4Na (ethylenediamine tetraacetic acid tetrasodium salt), and EDTA-3K (ethylenediamine tetraacetic acid monohydrogen tripotassium salt) and salts thereof; diethylenetriamine pentaacetic acid such as DTPA, DTPA-2Na (diethylenetriamine pentaacetic acid disodium salt) and DTPA-5Na (diethylenetriamine pentaacetic acid pentasodium salt) and salts thereof; nitrilotriacetic acid such as NTA, NTA-2Na (nitrilotriacetic acid disodium salt), and NTA-3Na (nitrilotriacetic acid trisodium salt) and salts thereof; ethylenediamine-N,N'-disuccinic acid and salts thereof; 3-hydroxy-2,2'-iminodisuccinic acid and salts thereof; L-aspartic acid-N,N'-diacetic acid and salts thereof, and N-(2-hydroxyethyl) imminodiacetic acid and salts thereof, and the like.

In addition, examples of the metal sealing agent other than acetate analog include ethylenediamine tetramethylenephosphonic acid and salts thereof, ethylenediamine tetramethaphosphate and salts thereof, ethylenediamine pyrrophosphoric acid and salts thereof, and ethylenediamine methaphosphate and salts thereof, and the like.

The metal sealing agent may be used alone, or may be used in combination of two or more.

When a metal sealing agent is contained, a content thereof can be, for example, 0.005% by mass or more and 0.1% by mass or less, and is preferably 0.01% by mass or more and 0.05% by mass or less with respect to the total amount of the reaction solution.

1.11 Antibacterial Agent

The reaction solution for pigment printing according to the present embodiment may contain an antibacterial agent. Examples of the antibacterial agent include sodium benzoate, sodium pentachlorophenol, sodium 2-pyridinethiol-1-oxide, sodium sorbate, sodium dehydroacetate, Proxel CRL, Proxel BDN, Proxel GXL, Proxel XL-2, Proxel IB, Proxel TN (all manufactured by Ronza Japan Co., Ltd., product name), 4-chloro-3-methylphenol (Preventol CMK manufactured by Bayer Co., Ltd. and the like), and the like.

When an antibacterial agent is contained, a content thereof can be, for example, 0.05% by mass or more and 1.0% by mass or less, and is preferably 0.1% by mass or more and 0.5% by mass or less with respect to the total amount of the reaction solution.

1.12. Other Components

In the reaction solution for pigment printing according to the present embodiment, as components other than the above, for example, various additives such as a softening agent, a solubilizing agent, a viscosity modifier, an ultraviolet absorber, an antioxidant, and a corrosion inhibitor can be appropriately added.

1.13 Method of Manufacturing Reaction Solution for Pigment Printing and Physical Properties The reaction solution for pigment printing according to the present embodiment is obtained by mixing the above-mentioned components in any order and performing filtering or the like depending on the necessity to remove impurities. As a method of mixing each component, a method of sequentially adding materials to a container equipped with a stirring device such as a mechanical stirrer and a magnetic stirrer, and performing stirring and mixing is appropriately used.

The reaction solution for pigment printing according to the present embodiment preferably has a surface tension of 20 to 40 mN/m, and more preferably has 22 to 35 mN/m at 20° C. from the viewpoint of reliability when ejected by an ink jet method. In addition, from the same viewpoint, the viscosity of the reaction solution at 20° C. is preferably 2 to 10 mPa·s, more preferably 2.5 to 8 mPa·s, more preferably 3 to 6 mPa·s, and particularly preferably 3.5 to 5 mPa·s. In order to maintain the surface tension and the viscosity within the above-mentioned ranges, the types of the polyhydric alcohol or the surfactant described above, the addition amount of these and water, and the like may be appropriately adjusted.

As the surface tension, a value measured by the Wilhelmy method can be adopted. For the measurement of the surface tension, for example, a surface tension meter such as CBVP-7 manufactured by Kyowa Interface Science Co., Ltd. can be used. In addition, the viscosity can be measured by increasing Shear Rate from 10 $[s^{-1}]$ to 1,000 $[s^{-1}]$ at 20° C. using, for example, a viscoelastic tester such as MCR-300 manufactured by Pysica, and reading the viscosity at the time of Shear Rate 200 $[s^{-1}]$.

A pH of the reaction solution for pigment printing according to the present embodiment at 20° C. is preferably 4.5 or higher, more preferably 5.0 or higher, further more preferably 5.5 or higher, even more preferably 6.0 or higher, particularly preferably 6.5 or higher, more particularly preferably 7.0 or higher, and even more particularly preferably 7.5 or higher. Since the reaction solution for pigment printing according to the present embodiment contains a cationic component, there is a case in which the pH tends to be low, and stainless steel of the ink jet head may be corroded. On the other hand, when the pH of the reaction solution is within the above-mentioned range, there is a tendency that the corrosion of the ink jet head can be reduced. The pH can be adjusted within the above-mentioned range by preferably using the above-mentioned alkaline compound.

2. Ink Set

An ink set according to an embodiment of the present disclosure includes a printing ink jet ink composition containing a pigment, resin particles, and water, and the above-mentioned reaction solution for pigment printing.

According to the ink set according to the present embodiment, since the above-mentioned reaction solution for pigment printing is provided, color developing properties, friction fastness, and intermittent printing stability can become favorable.

In the present disclosure, the ink set is a set of an ink and a reaction solution in which at least a printing ink jet ink composition and a reaction solution for pigment printing are combined. The printing ink jet ink composition provided in the ink set may be used alone, or may be used in combination of two or more. The same applies to the reaction solution for pigment printing provided in the ink set.

2.1 Reaction Solution for Pigment Printing

The ink set according to the present embodiment includes the above-mentioned reaction solution for pigment printing. Since the reaction solution for pigment printing is as described above, the description thereof will be omitted.

2.2 Printing Ink Jet Ink Composition

The ink set according to the present embodiment includes a printing ink jet ink composition containing a pigment, resin particles, and water.

Hereinafter, each component included in the printing ink jet ink composition provided in the ink set according to the present embodiment will be described. It should be noted that each component of the printing ink jet ink composition can be prepared independently of the above-mentioned reaction solution for pigment printing.

In addition, in the following description, the "printing ink jet ink composition" may also be referred to as an "ink jet ink composition", an "ink composition", or an "ink".

2.2.1 Pigment

The printing ink jet ink composition provided in the ink set according to the present embodiment contains a pigment. As the pigment, for example, an inorganic pigment or an organic pigment can be used. The pigment is a kind of coloring material. Examples of the coloring material include pigments or dyes.

The inorganic pigment is not particularly limited, and examples thereof include carbon blacks such as furnace black, lamp black, acetylene black, and channel black; and white inorganic oxides such as iron oxide, titanium oxide, zinc oxide, and silica.

Examples of carbon blacks include C.I. (Colour Index Generic Name) Pigment Black 1, 7, 11, and the like. Commercially available products may be used as the carbon blacks, for example, No. 2300, No. 900, MCF88, No. 33, No. 40, No. 45, No. 52, MA7, MA8, MA100, No. 2200B, and the like of Mitsubishi Chemical Corporation, Raven (registered trademark) 5750, 5250, 5000, 3500, 1255, and 700 of Columbian Carbon Company; Regal (registered trademark) 400R, 330R, 660R, Mogul (registered trademark) L, Monarch (registered trademark) 700, 800, 880, 900, 1000, 1100, 1300, 1400, and the like of CABOT Corporation; Color Black FW1, FW2, FW2V, FW18, FW200, 5150, 5160, 5170, Printex (registered trademark) 35, U, V, 140U, Special Black 6, 5, 4A, and 4 of Degussa Corporation, and the like.

Examples of organic pigments include a quinacridone-based pigment, a quinacridone quinone-based pigment, a dioxazine-based pigment, a phthalocyanine-based pigment, an anthrapyrimidine-based pigment, an anthancelon-based pigment, an indanslon-based pigment, a flavanthron-based pigment, a perylene-based pigment, diketopyrrolopyrrole-based pigment, a perinone-based pigment, a quinophthalone-based pigment, an anthraquinone-based pigment, a thioindigo-based pigment, a benzoimidazolone-based pigment, an isoindolinone-based pigment, an azomethine-based pigment, or an azo-based pigment, and the like.

Specific examples of the organic pigment include the following.

Examples of the cyan pigment include C. I. Pigment Blue 1, 2, 3, 15:3, 15:4, 15:34, 16, 22, 60, and the like; C. I. Vat Blue 4, 60; and the like, and are preferably a mixture of one or two or more selected from the group consisting of C. I. Pigment Blue 15:3, 15:4, and 60.

Examples of the magenta pigment include C. I. Pigment Red 5, 7, 12, 48(Ca), 48(Mn), 57(Ca), 57:1, 112, 122, 123, 168, 184, 202, C. I. Pigment Violet 19, and the like, and are preferably a mixture of one or two or more selected from the group consisting of C. I. Pigment Red 122, 202, and 209, and C. I. Pigment Violet 19.

Examples of the yellow pigment include C. I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, 185, and the like, and preferably include a mixture of one or two or more selected from the group consisting of C. I. Pigment Yellow 74, 109, 110, 128, 138, 150, and 180.

Pigments of other colors can also be used. Examples thereof include an orange pigment, a green pigment, and the like.

The pigment may be used alone, or may be used in combination of two or more.

The pigment is subjected to a surface treatment in order to enhance dispersibility in the ink composition, and in the pigment, a dispersant or the like is preferably blended.

The surface treatment of the pigment refers to a treatment to directly or indirectly bond a carbonyl group, a carboxyl group, an aldehyde group, a hydroxyl group, a sulfone group, an ammonium group, a functional group formed of salts thereof, or the like by physical or chemical treatment.

When a dispersant is blended in the ink composition, a dispersant having a hydrophobic portion (hydrophobic group) and a hydrophilic portion (hydrophilic group) in the molecular structure are preferably used. In such a dispersant, the hydrophobic portion has an action of being adsorbed on a particle surface of the pigment, and the hydrophilic portion has an action of being oriented on an aqueous medium side of the ink composition. Due to the action, there is a tendency that the pigment can be more stably contained in the ink composition as a dispersant. Such a dispersant is not particularly limited, and examples thereof include styrene-acrylic resin such as an acrylic resin, a styrene-(meth)acrylic acid copolymer, and a styrene-(meth)acrylic acid-(meth) acrate copolymer, a styrene-maleic acid-based resin, salts thereof, formalin condensates of aromatic sulfonate, and the like, and one or more selected from these groups can be adopted. A commercially available product may be used as the dispersant.

In addition, a method of coating particles of the pigment with a resin or the like to impart dispersibility may be used. As a method of coating the particles of the pigment, an acid analysis method, a phase inversion emulsification method, a mini-emulsion polymerization method, and the like can be adopted.

A content of the pigment can be appropriately adjusted depending on the intended use, and is preferably 0.1% by mass or more and 17.0% by mass or less, more preferably 0.2% by mass or more and 15.0% by mass or less, further more preferably 1.0% by mass or more and 10.0% by mass or less, and particularly preferably 2.0% by mass or more and 5.0% by mass or less with respect to the total amount of the ink composition. When the content of the pigment is within the above-mentioned range, there is a tendency that ejects performance at the time of ejection by the ink jet method can be further improved.

The ink composition may contain a dye as a coloring material other than the pigment. Examples of the dye include an acidic dye, a reactive dye, a direct dye, and the like.

2.2.2. Resin Particles

The printing ink jet ink composition provided in the ink set according to the present embodiment contains resin particles. The resin particles are particles containing a resin, and are also referred to as a "resin dispersant" or a "resin emulsion".

Examples of the resin include a urethane resin, a polycarbonate resin, a (meth)acrylic resin, a styrene resin, a silicone resin, a styrene acrylic resin, a fluorene resin, a polyolefin resin, a rosin-modified resin, a terpene resin, a polyester resin, a polyamide resin, an epoxy resin, a vinyl chloride resin, a vinyl chloride-vinyl acetate copolymer, an ethylene vinyl acetate resin, and the like. These resins may be used alone, or may be used in combination of two or more.

Among these, the resin particles are preferably urethane resin, polycarbonate resin, (meth)acrylic resin, and styrene resin, more preferably urethane resin and (meth)acrylic resin, and further more preferably urethane resin. In particular, when the resin particles are urethane resins, there is a case in which the cationic polymer contained in the above-mentioned reaction solution may react with the urethane resin, and color developing properties, friction fastness, bleeding, and the like become more favorable.

The urethane resin is a resin having a urethane bond in the molecule. From the viewpoint of storage stability of the ink, the urethane resin is preferably an anionic urethane resin having an anionic functional group such as a carboxy group, a sulfo group, and a hydroxy group.

Examples of the urethane resin include a polyether-type urethane resin including an ether bond in the main chain, a polyester-type urethane resin including an ester bond in the main chain, and a polycarbonate-type urethane resin including a carbonate bond in the main chain, in addition to a urethane bond. A plurality of types of these urethane resins can be used in combination.

Commercially available urethane resin products include ETERNACOLL UW-1501F, UW-1527F, UW-5002 (hereinabove, product name manufactured by UBE Corporation), Takelac WS-5000, W-6061, W-6110, WS-5984, WS-5100 (hereinabove, product name manufactured by Mitsui Chemicals, Inc.), Permarin UA-150, UA-200, U-coat UX-390 (hereinabove, product name manufactured by Sanyo Chemical Industries, Ltd.), Hydran WLS-210 (product name manufactured by DIC Corporation), and the like.

The polycarbonate resin is a resin having a polycarbonate bond in the molecule. When a urethane resin is not used, a polycarbonate resin is preferably used instead.

Examples of commercially available products of the (meth)acrylic resin include Movinyl 966A and 6760 (product names manufactured by Nippon Synthetic Chemical Industry Co., Ltd.), which are acrylic resins.

The (meth)acrylic resin means a resin having a (meth) acrylic skeleton. The (meth)acrylic resin is not particularly limited, and for example, a polymer of a (meth)acrylic monomer such as (meth)acrylic acid and (meth)acrylic acid ester, or a copolymer of a (meth)acrylic monomer and other monomer. Examples of the other monomer include a vinyl-based monomer such as styrene. In addition, in the present specification, "(meth)acrylic" is a concept including both "methacrylic" and "acrylic".

Examples of commercially available silicone resin products include POLON-MF014, POLON-MF-18T, POLON-MF-33, KM-2002-T (hereinabove, product names manufactured by Shin-Etsu Silicone Co., Ltd.), WACKER FINISH WR1100, NP2406, POWERSOFT FE 55, and TS2406 (hereinabove, product name manufactured by Asahi Kasei Corporation).

An acid value of the resin contained in the resin particles is not particularly limited, but is preferably 1 to 300 KOH mg/g, more preferably 10 to 200 KOH mg/g, and further more preferably 20 to 100 KOH mg/g.

A content of the resin particles is preferably 1.0% by mass or more, more preferably 2.0 to 20% by mass, and further more preferably 3.0 to 10% by mass in terms of solid content with respect to the total amount of the ink composition. When the content of the resin particles is within the above-mentioned range, there is a tendency that it is possible to obtain a recorded material having excellent color developing properties and excellent friction fastness.

2.2.3 Water

The printing ink jet ink composition provided in the ink set according to the present embodiment contains water. As such water, the same water as that contained in the above-mentioned reaction solution for pigment printing can be used, and the same content can be used.

2.2.4 Polyhydric Alcohol with Standard Boiling Point of 250° C. or Higher

The printing ink jet ink composition provided in the ink set according to the present embodiment may contain a polyhydric alcohol having a standard boiling point of 250° C. or higher. The types or contents of such polyhydric alcohols having a standard boiling point of 250° C. or higher can be the same as those of the above-mentioned reaction solution for pigment printing. In addition, a polyhydric alcohol having a standard boiling point of 230° C. or lower or an organic solvent may be contained, and can be the same as the above-mentioned reaction solution for pigment printing.

2.2.5 Surfactant

The printing ink jet ink composition provided in the ink set according to the present embodiment may contain a surfactant. As such a surfactant, the same surfactant as that contained in the above-mentioned reaction solution for pigment printing can be used, and the content can be the same.

2.2.6 pH Regulator

The printing ink jet ink composition provided in the ink set according to the present embodiment may contain a pH regulator. The pH regulator is not particularly limited, and examples thereof include an appropriate combination of acid, base, weak acid, and weak base. Examples of acids and bases used in such combination include sulfuric acid, hydrochloric acid, nitric acid and the like as inorganic acid; lithium hydroxide, sodium hydroxide, potassium hydroxide, potassium dihydrogen phosphate, disodium hydrogen phosphate, potassium carbonate, sodium carbonate, sodium hydrogen carbonate, ammonia, and the like as inorganic base; triethanolamine, diethanolamine, monoethanolamine, tripropanolamine, triisopropanolamine, diisopropanolamine, trishydroxy methylaminomethane (THAM), and the like as organic base; good buffer such as adipic acid, citric acid, succinic acid, lactic acid, N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamide)-2-aminoethanesulfonic acid (ACES), coramine hydrochloride, N-tris(hydroxylmethyl)methyl-2-aminoethanesulfonic acid (TES), acetoamide glycine, tricin, glycineamide, bicin, and the like, phosphate buffer, citrate buffer, tris buffer, and the like as organic acid, and the like.

As the ink composition, the pH regulator may be used alone, or may be used in combination of two or more. In addition, a total content of the ink composition with respect to the total mass when the pH regulator is used is, for example, 0.05% by mass or more and 3.0% by mass or less, and preferably 0.1% by mass or more and 1.0% by mass or less.

2.2.7 Other Components

The printing ink jet ink composition provided in the ink set according to the present embodiment can appropriately contain various additives, as components other than the above, such as a lubricant, a softening agent, a solubilizing agent, a viscosity modifier, an antioxidant, an antibacterial agent such as Proxel XL2 (product name manufactured by Arch Chemicals Inc.), a corrosion inhibitor, a metal sealing agent for capturing metal ions that affect dispersion (for example, sodium ethylenediamine tetraacetate), and the like.

2.2.8 Manufacturing and Physical Properties of Ink Composition

The printing ink jet ink composition provided in the ink set according to the present embodiment is obtained by mixing the above-mentioned components in any order and performing filtering or the like depending on the necessity to remove impurities. As a method of mixing each component, a method of sequentially adding materials to a container equipped with a stirring device such as a mechanical stirrer and a magnetic stirrer, and performing stirring and mixing is appropriately used.

The printing ink jet ink composition provided in the ink set according to the present embodiment preferably has a surface tension of 20 to 40 mN/m at 20° C., and more preferably has a surface tension of 22 to 35 mN/m from the viewpoint of reliability when ejected by an ink jet method. In addition, from the same viewpoint, the viscosity of the ink composition at 20° C. is preferably 1.5 to 10 mPa·s, more preferably 8 mPa·s or less, and further more preferably 2 to 8 mPa·s. In order to maintain the surface tension and the viscosity within the above-mentioned range, the types of the above-mentioned organic solvent and surfactant, the addition amount of these and water, and the like may be appropriately adjusted.

3. Recording Method

A recording method according to an embodiment of the present disclosure includes an ink adhering step of adhering an ink composition to a fabric by an ink jet method, and a reaction solution adhering step of adhering the above-mentioned reaction solution for pigment printing to the fabric by the ink jet method.

According to the recording method according to the present embodiment, since the reaction solution adhering step of adhering the above-mentioned reaction solution for pigment printing is provided, color developing properties, friction fastness, and intermittent printing stability can become favorable.

The recording method according to the present embodiment is performed on a fabric. The material constituting the fabric is not particularly limited, and examples thereof may include natural fibers such as cotton, linen, wool, and silk; synthetic fibers such as polypropylene, polyester, acetate, triacetate, polyamide, and polyurethane, and biodegradable fibers such as polylactic acid, and blended fibers thereof.

The fabric preferably has a hydroxyl group. Examples of such a fabric include a fabric containing cellulose such as cotton and linen, a fabric containing polyurethane, and the like. When the fabric has a hydroxyl group, there is a case in which a crosslinking reaction may occur between the cationic polymer contained in the above-mentioned reaction solution and the hydroxyl group of the fabric, and it is possible to obtain the effect of improving color developing properties by thickening aggregation and of improving friction fastness by improving adhesive properties between the fabric and the ink layer.

As the fabric, the fiber may be any form of a woven fabric, a knitted fabric, a non-woven fabric, and the like. In addition, a basis weight of the fabric used in the present embodiment is not particularly limited, and may be 1.0 oz or more and 10.0 oz or less, preferably 2.0 oz or more and 9.0 oz or less, more preferably 3.0 oz or more and 8.0 oz or less, and further more preferably 4.0 oz or more and 7.0 oz or less. When the basis weight of the fabric is within such a range, favorable recording can be performed. In addition, in the ink jet recording method according to the present embodiment, a plurality of types of fabrics having different basis weights can be applied, and favorable printing can be performed.

In the present embodiment, examples of the form of the fabric include cloth, garment or other clothing items, and the like. The cloth includes a woven fabric, a knitted fabric, a non-woven fabric, and the like. Garment or other clothing items include sewn T-shirts, handkerchiefs, scarves, towels, handbags, cloth bags, and furniture cloth such as curtains, sheets, bedspreads, and wallpaper, cloth before and after cutting as parts to be sewn, and the like. Examples of these forms include a long roll-shaped one, a long one cut into a predetermined size, a product-shaped one, and the like.

As the fabric, a cotton fabric pre-colored with a dye may be used. Examples of dyes in which the fabric is pre-colored include water-soluble dyes such as acidic dyes and basic dyes, disperse dyes in which dispersants are used in combination, reactive dyes, and the like. When a cotton fabric is used as the fabric, a reactive dye suitable for dyeing cotton is preferably used.

Hereinafter, each step of the recording method according to the present embodiment will be described.

3.1 Ink Adhering Step

A recording method according to the present embodiment includes an ink adhering step of adhering an ink composition to a fabric by an ink jet method.

As the ink composition, the above-mentioned printing ink jet ink composition can be preferably used.

The ink jet method is a recording method in which droplets of ink and the like are ejected from a nozzle of an ink jet head of an ink jet recording apparatus and the like and applied to a recording medium.

The adhesion amount of the ink composition is preferably 10 to 21 mg/inch$^2$, more preferably 12 to 20 mg/inch$^2$, and further more preferably 14 to 19 mg/inch$^2$, and particularly preferably 15 to 18 mg/inch$^2$ per unit area of the recording region of the fabric.

3.1.1 Step Interval

In the recording method according to the present embodiment, the time difference between the ink adhering step and the reaction solution adhering step described later is preferably within 5 seconds. When the ink adhering step and the reaction solution adhering step are performed with such a time difference, a wet-on-wet method in which the second droplet to be adhered later is adhered before the first droplet previously adhered dries can be used. When the first droplet is an ink composition, the second droplet is a reaction solution, and when the first droplet is a reaction solution, the second droplet is an ink composition. The wet-on-wet method has advantages in terms of miniaturization and high speed of the apparatus, whereas the method has a problem of being easily deteriorated in bleeding, color developing properties, and friction fastness, but according to the recording method according to the present embodiment, it is possible to obtain excellent color developing properties and friction fastness, and it is also possible to suppress bleeding even in such a wet-on-wet method. In addition, in the recording method according to the present embodiment, when the time difference between the step intervals is within 5 seconds, there is a tendency that the reaction between the ink and the reaction solution more easily proceeds, and color developing properties and friction fastness become more excellent.

In the present disclosure, the time difference between the ink adhering step and the reaction solution adhering step means a time difference from the last ejection of the reaction solution to the first ejection of the ink composition.

In addition, in the following description, "alternate strike" means that the ink composition and the reaction solution are adhered to the same main scanning (moving the ink jet head in a direction perpendicular to a transport direction of the fabric) on the same scanning region of the fabric to form a layer containing the ink composition and the reaction solution. "First strike" means that the ink composition and the reaction solution are adhered to the same scanning region of the fabric by different main scanning to form a layer containing the reaction solution and laminate a layer containing the ink composition thereon. In particular, when the layer containing the reaction solution is first formed and then the layer containing the ink composition is formed by being laminated thereon is referred to as "reaction solution first strike".

In the case of alternate strike, the time difference between the ink adhering step and the reaction solution adhering step is preferably 1 second or less, more preferably 0.8 seconds or less, further more preferably 0.6 seconds or less, and particularly preferably 0.4 seconds or less. A lower limit is not particularly limited, but is preferably 0.1 seconds or more, and more preferably 0.2 seconds or more. In the case of alternate strike, the time difference between the ink adhering step and the reaction solution adhering step is particularly preferably 0.3 seconds. With such a time difference, there is a tendency that the reaction between the ink and the reaction solution more easily proceeds, and color developing properties and friction fastness become more excellent.

In the case of reaction solution first strike, the time difference between the ink adhering step and the reaction solution adhering step is preferably 4.9 seconds or less, more preferably 4.8 seconds or less, further more preferably 4.7 seconds or less, and particularly preferably 4.6 seconds or less. A lower limit is not particularly limited, but is preferably 3.0 seconds or more, more preferably 3.5 seconds or more, further more preferably 4.0 seconds or more, particularly preferably 4.2 seconds or more, and more particularly preferably 4.4 seconds or more. In the case of first strike of the reaction solution, the time difference between the ink adhering step and the reaction solution adhering step is particularly preferably 4.5 seconds. With such a time difference, there is a tendency that the reaction between the ink and the reaction solution more easily proceeds, and color developing properties and friction fastness become more excellent.

3.1.2 Adhesion Method

3.1.2.1 Alternate Strike

In the recording method according to the present embodiment, the reaction solution adhering step and the ink adhering step, which will be described later, are performed by an ink jet method, the ink jet method is a method in which the ink jet head is moved in a direction perpendicular to a transport direction of the fabric to perform recording and main scanning is performed a plurality of times, and the reaction solution and the ink composition may be adhered to the same scanning region of the fabric by the same main scanning, and the same main scanning is preferably performed a plurality of times on the same main scanning region.

When this is the case, alternate strike can be performed. That is, a layer containing the ink composition and the reaction solution is adhered to a certain region of the fabric by a certain main scanning, and then a layer containing the ink composition and the reaction solution can be adhered thereon by another main scanning. With this, since the reaction solution and the ink composition are alternately overlapped and laminated (overlapped in a millefeuille shape), there is a tendency that the components of both are more easily mixed and the reaction more easily proceeds, and color developing properties, friction fastness, and suppression of bleeding are more excellent.

When the same main scanning is performed a plurality of times on the same scanning region, the main scanning for adhering the ink composition and the reaction solution passes over the same region of the fabric a plurality of times. As the number of times of scanning increases, there is a tendency that the ink or the reaction solution can be adhered to a desired region in a plurality of times (a plurality of passes), and the image quality of the obtained recorded matter is further improved.

When performing recording on any region, the number of times that the ink jet head passes over the region is also referred to as "pass". For example, when the main scanning for adhering the ink composition and the reaction solution is performed four times on the same region, the number of passes is referred to as four passes and the like. For example, in FIG. 3, when a length of one sub-scanning in a sub-scanning direction SS is one-fourth of a length of the sub-scanning direction SS of a nozzle row, four times of scanning are performed on a rectangular scanning region having a length of one sub-scanning in the sub-scanning direction SS and extending in a main scanning direction MS. The number of times of scanning when viewed in this way is referred to as the number of scanning, the number of passes, or the like. The number of times of scanning is 2 or more, preferably 3 or more, and more preferably 4 or more. In addition, the number of times of scanning is preferably 10 or less, more preferably 8 or less, further more preferably 6 or less, and particularly preferably 4 or less. According to the recording method according to the present embodiment, even when the number of times of scanning is within the above-mentioned range, there is a tendency that color developing properties, friction fastness, and suppression of bleeding are more excellent.

In addition, in the above-mentioned alternate striking, a layer containing the reaction solution may be formed by a main scanning different from the main scanning for forming the layer containing the ink composition and the reaction solution, and the layer containing the ink composition and the reaction solution and the layer containing the reaction solution may be laminated and formed. With this, by forming the layer containing the reaction solution, there is a case in which color developing properties or friction fastness is further improved. The formation of the layer containing the reaction solution may be performed before or after the formation of the layer containing the ink composition and the reaction solution, but it is preferably performed before the formation.

3.1.2.2 First Strike

In the recording method according to the present embodiment, the reaction solution adhering step and the ink adhering step, which will be described later, are performed by an ink jet method, the ink jet method is a method in which the ink jet head is moved in a direction perpendicular to a transport direction of the fabric to perform recording and main scanning is performed a plurality of times, and the reaction solution and the ink composition may be adhered on to the same scanning region of the fabric by different main scanning.

In such a way, first strike can be performed, and the layer containing the reaction solution and the layer containing the ink composition can be laminated and formed. In the recording method according to the present embodiment, color developing properties, friction fastness, and suppression of bleeding can become favorable even with such a first strike.

In the first strike, the order is not limited as long as the ink composition and the reaction solution are adhered by different main scanning, but in the reaction solution first strike, more preferably the reaction solution is first adhered and the ink composition is adhered thereon.

In the first strike, different main scanning, in which the ink composition and the reaction solution are adhered to the scanning region, may be performed a plurality of times on the same scanning region. For example, it is considered to record the reaction solution in 4 passes and then record the ink composition in 4 passes. It should be noted that the number of passes in the first strike may be set independently for each of the ink composition and the reaction solution.

3.1.2.3 Other Adhesion Method

In the above-mentioned alternate strike or first strike, a serial type ink jet head is used, but the ink adhering step and the reaction solution adhering step may be performed using a line type ink jet head.

That is, in the recording method according to the present embodiment, the reaction solution adhering step and the ink adhering step, which will be described later, are performed by an ink jet method, and in the ink jet method, one scanning may be performed on a fabric to be transported by the ink jet head using an ink jet head (line head) having a length of a recording width or more of the fabric.

In such a line type recording method, the ink composition and the reaction solution are ejected and adhered to the fabric while relatively moving positions of the line head and the fabric in the scanning direction (longitudinal direction, transport direction of the fabric) intersecting a width direction of the fabric.

3.2 Reaction Solution Adhering Step

The recording method according to the present embodiment includes a reaction solution adhering step of adhering the above-mentioned reaction solution for pigment printing to the fabric by an ink jet method.

An adhesion amount of the reaction solution is preferably 10 to 21 mg/inch$^2$, more preferably 12 to 20 mg/inch$^2$, and further more preferably 14 to 19 mg/inch$^2$, and particularly preferably 15 to 18 mg/inch$^2$ per unit area of the recording region of the fabric.

3.2.1 Step Interval

As described above, in the recording method according to the present embodiment, the time difference between the ink adhering step and the reaction solution adhering step described above is preferably within 5 seconds. The preferable time difference in the case of the alternate strike or the reaction solution first strike is as described above, and the description thereof will be omitted.

3.2.2 Adhesion Method

As described above, the recording method according to the present embodiment preferably performs alternate strike, and may perform first strike or an ink adhering step and a reaction solution adhering step by using a line type ink jet head.

3.3 Other Steps

The recording method according to the present embodiment may include a step of heating the ink and the like adhered to the fabric after the ink adhering step and the reaction solution adhering step described above. The heating method is not particularly limited, and examples thereof include a heat press method, a normal pressure steam method, a high pressure steam method, a thermofix method, and the like. A heat source at the time of heating is not particularly limited, but for example, an infrared lamp and the like can be used. A heating temperature is preferably a temperature at which resin particles of the ink are fused and the medium such as moisture volatilizes. For example, the heating temperature is preferably about 100° C. or higher and about 200° C. or lower, more preferably 170° C. or lower, and further more preferably 160° C. or lower. Here, the heating temperature in the heating step refers to a surface temperature of an image and the like formed on the fabric. The time for performing heating is not particularly limited, and is, for example, 30 seconds or more and 20 minutes or less.

After the heating step, a step of washing the printed fabric with water and drying thereof may be provided. In washing with water, depending on the necessity, as a soaping treatment, components such as ink that was not fixed on the fabric may be washed away using a hot soap solution and the like.

3.4 Ink Jet Printing Apparatus

An example of an ink jet printing apparatus including an ink jet head, which can be applied to the recording method according to the present embodiment, will be described with reference to FIG. 1.

The ink jet printing apparatus used in the following description is a serial printer in which an ink jet head for recording is mounted on a carriage that moves in a predetermined direction, and the ink jet head moves with the movement of the carriage to eject droplets to the fabric. The ink jet printing apparatus that can be applied to the recording method according to the present embodiment is not limited to a serial printer, and may be a line printer. A line printer is a type of printer in which an ink jet head is formed to be wider than a width of a fabric, and droplets are ejected to the fabric without the ink jet head moving.

The ink jet printing apparatus is an apparatus for printing by landing droplets on a fabric by an ink jet head as a liquid ejection portion that ejects minute droplets of an ink composition or a reaction solution. FIG. 1 is a schematic perspective view showing an ink jet printing apparatus used in the embodiment.

As shown in FIG. 1, a printer 1 in the present embodiment includes an ink jet head 3, a carriage 4, a main scanning mechanism 5, a platen roller 6, and a control portion (not shown) that controls operation of the entire printer 1. The carriage 4 is equipped with ink jet head 3, and liquid cartridges 7a, 7b, 7c, 7d, 7e, and 7f for storing an ink composition and a reaction solution supplied to the ink jet head 3 are detachable.

The main scanning mechanism 5 includes a timing belt 8 coupled to the carriage 4, a motor 9 for driving the timing belt 8, and a guide shaft 10. The guide shaft 10 is installed as a support member for the carriage 4 in a scanning direction of the carriage 4, that is, in a main scanning direction MS. The carriage 4 is driven by the motor 9 via the timing belt 8 and can reciprocate along the guide shaft 10. With this, the main scanning mechanism 5 has a function of reciprocating the carriage 4 in the main scanning direction MS.

The platen roller 6 has a function of transporting a fabric 2 to be printed in a sub-scanning direction SS orthogonal to the main scanning direction MS, that is, in a length direction of the fabric 2. With this, the fabric 2 is transported in the sub-scanning direction SS. The carriage 4 equipped with the ink jet head 3 can reciprocate in the main scanning direction MS which substantially coincides with a width direction of the fabric 2, and the ink jet head 3 is configured so that the fabric 2 can be scanned relatively in the main scanning direction MS and the sub-scanning direction SS.

The liquid cartridges 7a, 7b, 7c, 7d, 7e, and 7f are six independent liquid cartridges. The liquid cartridges 7a, 7b, 7c, 7d, 7e, and 7f can store the ink composition and the reaction solution used in the recording method in the present embodiment. In these liquid cartridges, the ink composition and the reaction solution exhibiting colors such as black, cyan, magenta, yellow, white, and orange are individually stored, and can be used in any combination. In FIG. 1, the number of liquid cartridges is set to 6, but the number is not limited thereto. At the bottom of the liquid cartridges 7a, 7b, 7c, 7d, 7e, and 7f, there are provided supply ports (not shown) for supplying the ink composition or reaction solution stored in each liquid cartridge to the ink jet head 3.

The ink jet head 3 is a unit that sprays the ink composition and the reaction solution supplied from the liquid cartridges 7a, 7b, 7c, 7d, 7e, and 7f from a plurality of nozzles to the fabric 2 under control by a control portion (not shown) and adhering thereof. The ink jet head 3 is provided with the plurality of nozzles for ejecting the ink composition and the reaction solution and adhering thereof to the fabric 2 on a surface opposing the fabric 2 to which the ink composition and the reaction solution are adhered. The plurality of nozzles are disposed in a row to form a nozzle row, and the nozzle row is individually disposed corresponding to each color ink composition and reaction solution. Each color ink composition and reaction solution are supplied to the ink jet head 3 from each liquid cartridge, and are ejected as droplets from a nozzle by an actuator (not shown) in the ink jet head 3. When the ejected droplets of the ink composition and the reaction solution land on the fabric 2, and adhesion treatment on the fabric 2 is performed, an image, a text, a pattern, a color, and the like using the ink are formed on a printing region of the fabric 2. A plurality of the ink jet heads 3 may be provided in the carriage 4.

Here, in the ink jet head 3, a piezoelectric element is used as an actuator which is a driving unit, but the method is not limited thereto. For example, an electromechanical conversion element that displaces a diaphragm as an actuator by electrostatic adsorption, or an electrothermal conversion element that ejects an ink composition as droplets by air bubbles generated by heating may be used.

The ink jet head 3 has a nozzle group for reaction solution for ejecting a reaction solution and a nozzle group for ink composition for ejecting an ink composition. The nozzle group from which ejection is performed means a nozzle group used for recording in the recording method. When there is an image to be temporarily recorded on a region of the fabric opposing the nozzle group at a time of performing the main scanning, the nozzle group is a nozzle group for ejecting an ink and the like from the nozzle, and a nozzle group continuous in the sub-scanning direction SS. Therefore, although the nozzle group itself exists, the nozzle group not used for recording in the recording method is not included in the nozzle group from which ejection is performed.

Figure 2:
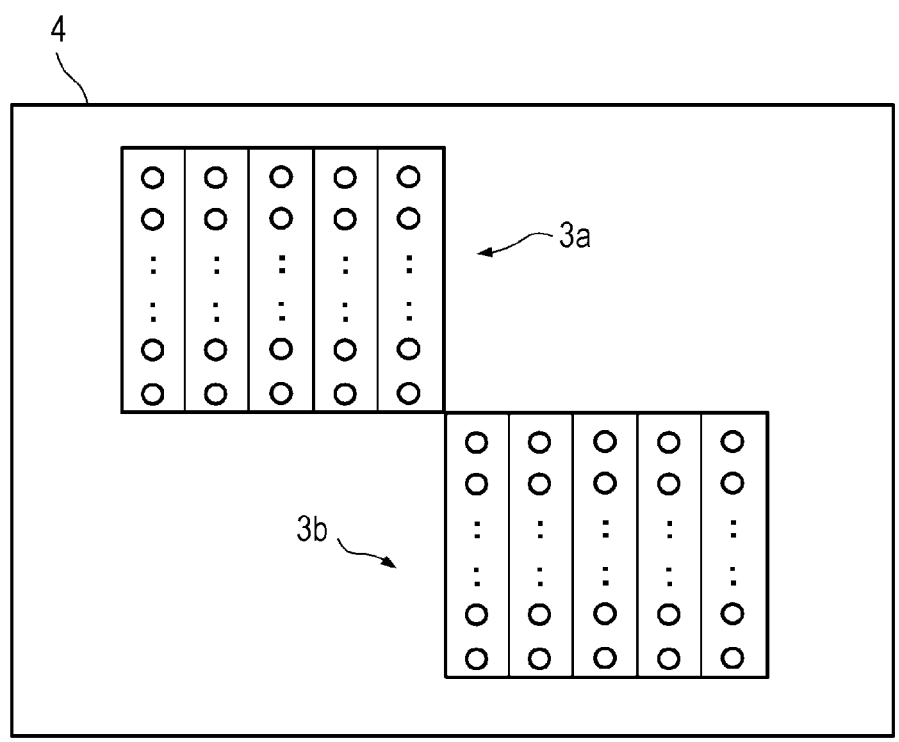
FIG. 2 is a schematic diagram showing an example of disposing of an ink jet head of an ink jet printing apparatus.
Figure 2:
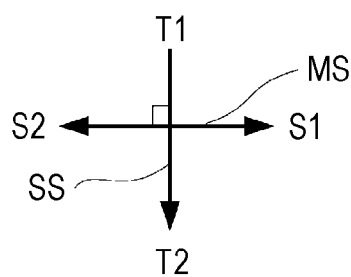
Figure 3:
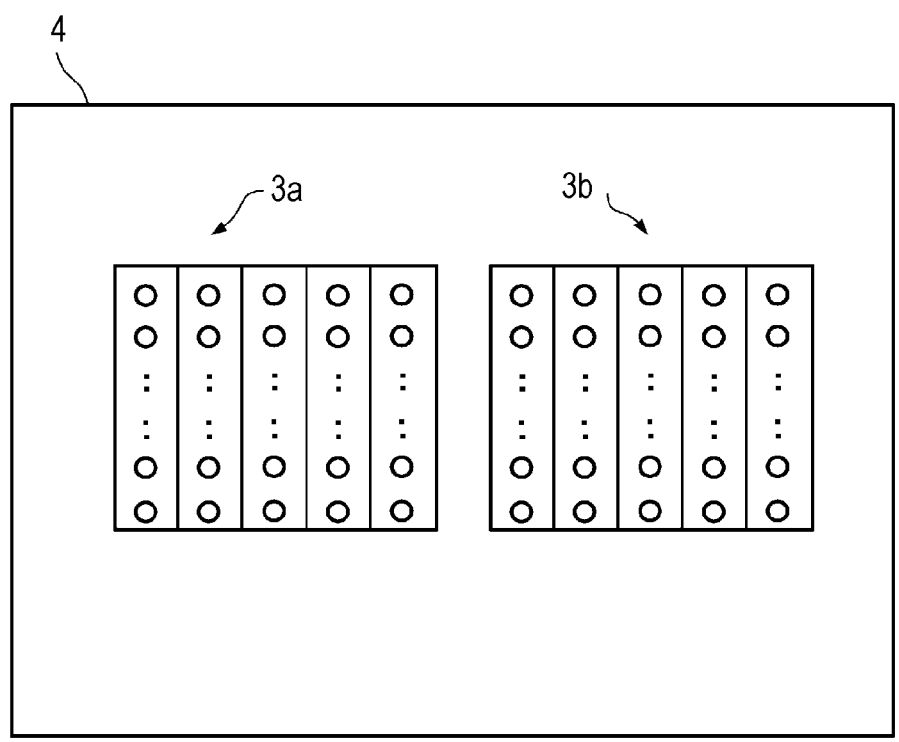
FIG. 3 is a schematic diagram showing an example of disposing of an ink jet head of an ink jet printing apparatus.
Figure 3:
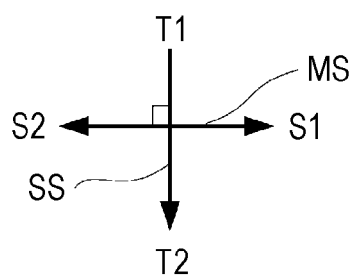
Figure 4:
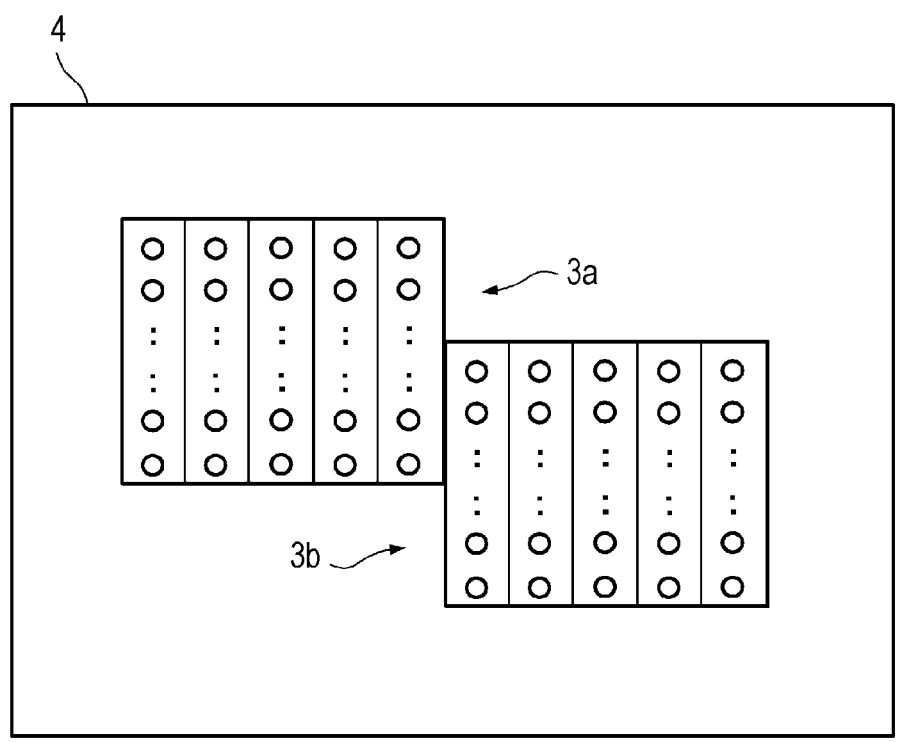
FIG. 4 is a schematic diagram showing an example of disposing of an ink jet head of an ink jet printing apparatus.
Figure 4:
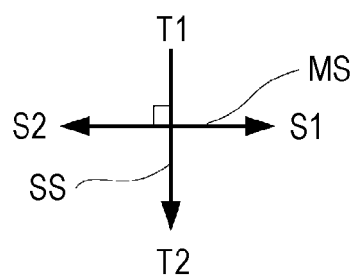

FIGS. 2, 3, and 4 show an example of disposing of a head of the ink jet head 3. In FIG. 2, an ink jet head 3a and an ink jet head 3b are disposed from an upstream to a downstream in the transport direction (sub-scanning direction SS). In addition, in FIG. 3, the ink jet head 3a and the ink jet head 3b are disposed at the same position in the sub-scanning direction SS, and are disposed side by side. In addition, in FIG. 4, the ink jet head 3a and the ink jet head 3b are disposed from the upstream to the downstream in the transport direction (sub-scanning direction SS), having portions overlapping each other.

In the recording method according to the present embodiment, the ink jet head 3 preferably has a configuration in which a nozzle group for reaction solution used for recording is provided upstream of or in an overlapping portion of a nozzle group for ink composition used for recording in a transport direction of the fabric. In addition, from the same viewpoint, preferably the head that ejects a reaction solution is positioned at the same position as that of the head that ejects the ink composition with respect to the transport direction of the fabric, or is positioned upstream of the head that ejects the ink composition in the transport direction of the fabric. With such a configuration, droplets can be adhered by alternate strike or first strike of the reaction solution, and components of the ink composition and the reaction solution are more easily mixed and the reaction more easily proceeds, and thus there is a tendency that color developing properties, friction fastness, and suppression of bleeding are more excellent.

For example, in an example of FIG. 2, by using the ink jet head 3a as a head that ejects a reaction solution and the ink jet head 3b as a head that ejects an ink composition, the nozzle group for reaction solution used for recording can be provided upstream of the nozzle group for ink composition used for recording in the transport direction (sub-scanning direction SS) of the fabric. In such a case, the reaction solution is adhered to the fabric before the ink composition. That is, the reaction solution first strike can be performed, a layer containing the reaction solution can be formed, and then a layer containing the ink composition can be laminated and formed.

For example, in an example of FIG. 3, when the ink jet head 3a is used as a head that ejects a reaction solution, the ink jet head 3b is used as a head that ejects an ink composition, and a portion at which a nozzle group for reaction solution used for recording and a nozzle group for ink composition used for recording overlap with each other is included, alternate strike can be performed. That is, lamination in which the reaction solution and the ink composition alternately overlap with each other (millefeuille shaped lamination) is possible.

The "overlapping portion" refers to a portion positioned at the same position in the sub-scanning direction SS, among the nozzle group for ink composition used for recording and the nozzle group for reaction solution used for recording. With this, the ink composition and the reaction solution are overlapped and adhered to the fabric by the same main scanning.

For example, in an example of FIG. 4, when the ink jet head 3a is used as a head that ejects a reaction solution, the ink jet head 3b is used as a head that ejects an ink composition, and a portion at which the nozzle group for reaction solution used for recording and the nozzle group for ink composition used for recording overlap each other is included, alternate strike can be performed. In addition, when the ink jet head 3a is used as a head that ejects a reaction solution, the ink jet head 3b is used as a head that ejects an ink composition, a portion at which the nozzle group for reaction solution used for recording and the nozzle group for ink composition used for recording overlap each other is not included, and a nozzle group for reaction solution used for recording is provided upstream of the nozzle group for ink composition used for recording in the transport direction (sub-scanning direction SS) of the fabric, reaction solution first strike can be performed.

The printer 1 may be provided with a drying unit or a heating unit (neither of which is shown). The drying unit and the heating unit are units that efficiently dry the reaction solution or the ink adhered to the fabric 2. As long as the drying unit and the heating unit are provided at positions at which the fabric 2 can be dried and heated, the installation positions thereof are not particularly limited. In order to efficiently dry the ink or the reaction solution adhered to the fabric 2, for example, in FIG. 1, the drying unit and the heating unit can be installed at a position opposing the ink jet head 3.

Examples of the drying unit and the heating unit include a print heater mechanism that heats the fabric 2 in contact with a heat source, a mechanism that irradiates infrared rays or microwave that is an electromagnetic wave having a maximum wavelength of about 2,450 MHz, and the like, a dryer mechanism that blows warm air, and the like. Heating of the fabric 2 is performed before or when the droplets ejected from the nozzle of the ink jet head 3 are adhered to the fabric 2. Various heating conditions, for example, timing of heating execution, heating temperature, heating time, and the like are controlled by a control portion.

In addition, the drying unit and the heating unit may be installed on the downstream of the fabric 2 in the transport direction. In this case, the ink or the reaction solution ejected from the nozzle is adhered to the fabric 2 to form an image, and then the fabric 2 is heated. With this, drying properties of the ink or the reaction solution adhered to the fabric 2 are improved.

4. Example

Hereinafter, the present disclosure will be described in more detail with reference to examples, but the present disclosure is not limited to these examples. Hereinafter, "%" is based on mass unless otherwise specified.

4.1 Preparation of Reaction Solution for Pigment Printing

Each component was put in a container so as to have compositions shown in Tables 1 to 3 below, pure water was added so that a total amount of each reaction solution is 100% by mass, the mixture was mixed and stirred using a magnetic stirrer for 2 hours, and then the mixture was sufficiently mixed by performing a dispersion treatment in a bead mill filled with zirconia beads having a diameter of 0.3 mm. After stirring for 1 hour, a reaction solution for pigment printing according to each Example and each Comparative Example was obtained by filtering using a 5 μm PTFE membrane filter. In addition, the numerical value of a cationic polymer in Tables 1 to 3 below indicates the mass % in terms of solid content which is an active component.

TABLE 1

| Water level | Content | Boiling point | Example 1 | Example 2 | Example 3 | Example 4 | Example 5 | Example 6 | Example 7 |
|---|---|---|---|---|---|---|---|---|---|
| Polyvalent metal salt | Magnesium chloride | — | | | | | | | |
| | Magnesium sulfate | — | 0.5% | 1.0% | 2.0% | 3.0% | 4.0% | 6.0% | 3.0% |
| | Calcium chloride | — | | | | | | | |
| Cationic polymer | Kymene 557 | — | 2.0% | 2.0% | 2.0% | 2.0% | 2.0% | 2.0% | 2.0% |
| | Milliogen P-20 | — | | | | | | | |
| | Unisense FPA 100L | — | | | | | | | |
| | Unisense KHE 107L | — | | | | | | | |
| Moisturizing agent polyhydric alcohol | Glycerin | 290° C. | 14.0% | 14.0%% | 14.0% | 14.0% | 14.0% | 14.0% | 14.0% |
| | Triethylene glycol | 287° C. | | | | | | | |
| | Propylene glycol | 188° C. | 14.0% | 14.0% | 14.0% | 14.0% | 14.0% | 14.0% | 14.0% |
| Polyandric alcohol | 1,3-butylene glycol | 207° C. | | | | | | | |
| Alkaline compound | Triethanolamine | — | | | | | | | 1.0% |
| | Triisopropanolamine | — | | | | | | | |
| | Potassium hydroxide | — | | | | | | | |
| | Sodium hydroxide | — | | | | | | | |
| Surfactant | Orfin E1010 | — | 1.0% | 1.0% | 1.0% | 1.0% | 1.0% | 1.0% | 1.0% |
| Metal sealing agent | EDTA-2Na | — | 0.02% | 0.02% | 0.0236 | 0.02% | 0.02% | 0.02% | 0.02% |
| Antibacterial agent | Proxel XL2 | — | 0.30% | 0.30% | 0.30% | 0.30% | 0.30% | 0.30% | 0.30% |
| Physical properties | Viscosity (mPa · s/20° C.) | | 3.9 | 3.9 | 3.9 | 4.0 | 4.0 | 3.9 | 4.1 |
| | pH(20° C.) | | 3.8 | 3.8 | 3.8 | 3.8 | 3.8 | 3.8 | 7.7 |
| Content ratio | b.p. 230° C. or lower/b.p. 250° C. or higher | | 1.0 | 1.0 | 1.0 | 1.0 | 1.0 | 1.0 | 1.0 |
| | b.p. 250° C. or higher/cationic polymer | | 7.0 | 7.0 | 7.0 | 7.0 | 7.0 | 7.0 | 7.0 |
| | Alkaline compound/cationic polymer | | 0.0 | 0.0 | 0.0 | 0.0 | 0.0 | 0.0 | 0.5 |
| | Cationic polymer/polyvalent metal salt | | 4.0 | 2.0 | 1.0 | 0.7 | 0.5 | 0.3 | 0.7 |
| Recoding condition | Used ink | | Bk | Bk | Bk | Bk | Bk | Bk | Bk |
| | Applying method of reaction solution | | IJ | IJ | IJ | IJ | IJ | J | J |
| Evaluation | Intermittent painting stability | | A | A | A | A | A | A | A |
| | Color developing properties | | B | A | A | A | A | B | A |
| | Bleeding | | B | A | A | A | A | A | A |
| | Wet friction fastness | | A | A | A | A | A | B | A |
| | Pitting corrosion | | Present | Present | Present | Present | Present | Present | Absent |

| Water level | Content | Boiling point | Example 8 | Example 9 | Example 10 | Example 11 | Example 12 | Example 13 | Example 14 |
|---|---|---|---|---|---|---|---|---|---|
| Polyvalent metal salt | Magnesium chloride | — | | | | | | | |
| | Magnesium sulfate | — | 3.0% | 3.0% | 3.0% | 3.0% | 3.0% | 3.0% | |
| | Calcium chloride | — | | | | | | | 3.0% |
| Cationic polymer | Kymene 557 | — | 2.0% | 2.0% | 2.0% | 2.0% | 2.0% | 2.0% | 2.0% |
| | Milliogen P-20 | — | | | | | | | |
| | Unisense FPA 100L | — | | | | | | | |
| | Unisense KHE 107L | — | | | | | | | |
| Moisturizing agent polyhydric alcohol | Glycerin | 290° C. | 14.0% | 14.0% | 14.0% | 14.0% | 14.0% | 14.0% | 14.0% |
| | Triethylene glycol | 287° C. | | | | | | | |
| | Propylene glycol | 188° C. | 14.0% | 14.0% | 14.0% | 14.0% | 14.0% | 14.0% | 14.0% |
| Polyandric alcohol | 1,3-butylene glycol | 207° C. | | | | | | | |
| Alkaline compound | Triethanolamine | — | | | | | | | |
| | Triisopropanolamine | — | 0.5% | 1.0% | 1.5% | 2.0% | | | |
| | Potassium hydroxide | — | | | | | 0.20% | | |
| | Sodium hydroxide | — | | | | | | 0.20% | |
| Surfactant | Orfin E1010 | — | 1.0% | 1.0% | 1.0% | 1.0% | 1.0% | 1.0% | 1.0% |
| Metal sealing agent | EDTA-2Na | — | 0.02% | 0.02% | 0.02% | 0.02% | 0.02% | 0.02% | 0.02% |
| Antibacterial agent | Proxel XL2 | — | 0.30% | 0.30% | 0.30% | 0.30% | 0.30% | 0.30% | 0.30% |
| Physical properties | Viscosity (mPa · s/20° C.) | | 4.1 | 4.1 | 4.1 | 4.1 | 4.0 | 4.0 | 4.0 |
| | pH(20° C.) | | 6.0 | 7.3 | 7.8 | 8.1 | 3.9 | 6.8 | 3.8 |
| Content ratio | b.p. 230° C. or lower/b.p. 250° C. or higher | | 1.0 | 1.0 | 1.0 | 1.0 | 1.0 | 1.0 | 1.0 |
| | b.p. 250° C. or higher/cationic polymer | | 7.0 | 7.0 | 7.0 | 7.0 | 7.0 | 7.0 | 7.0 |
| | Alkaline compound/cationic polymer | | 0.3 | 0.5 | 0.8 | 1.0 | 0.1 | 0.1 | 0.0 |
| | Cationic polymer/polyvalent metal salt | | 0.7 | 0.7 | 0.7 | 0.7 | 0.7 | 0.7 | 0.7 |
| Recoding condition | Used ink | | Bk | Bk | Bk | Bk | Bk | Bk | Bk |
| | Applying method of reaction solution | | IJ | IJ | IJ | IJ | IJ | IJ | IJ |
| Evaluation | Intermittent painting stability | | A | A | A | A | A | A | A |
| | Color developing properties | | A | A | A | A | A | A | A |
| | Bleeding | | A | A | A | A | A | A | A |

TABLE 1-continued

|  | | | | | | | |
|---|---|---|---|---|---|---|---|
| Wet friction fastness | A | A | A | B | A | A | C |
| Pitting corrosion | Absent | Absent | Absent | Absent | Absent | Absent | Present |

TABLE 2

| Water level | Content | Boiling point | Example 15 | Example 16 | Example 17 | Example 18 | Example 19 | Example 20 | Example 21 | Example 22 | Example 23 |
|---|---|---|---|---|---|---|---|---|---|---|---|
| Polyvalent metal salt | Magnesium chloride | — | | | | | | | | | |
| | Magnesium sulfate | — | 3.0% | 3.0% | 3.0% | 3.0% | 3.0% | 3.0% | 3.0% | 3.0% | 3.0% |
| | Calcium chloride | — | | | | | | | | | |
| Cationic polymer | Kymene 557 | — | 0.3% | 0.5% | 1.0% | 3.0% | 4.0% | 5.0% | 6.0% | | |
| | Milliogen P-20 | — | | | | | | | | 2.0% | |
| | Unisense FPA 100L | — | | | | | | | | | |
| | Unisense KHE 107L | — | | | | | | | | | 2.0% |
| Moisturizing agent polyhydric alcohol | Glycerin | 290° C. | 15.0% | 15.0% | 15.0% | 12.0% | 10.0% | 6.0% | 5.0% | 14.0% | 14.0% |
| | Triethylene glycol | 287° C. | | | | | | | | | |
| | Propylene glycol | 188° C. | 15.0% | 15.0% | 15.0% | 12.0% | 10.0% | 6.0% | 5.0% | 14.0% | 14.0% |
| Polyandric alcohol | 1,3-butylene glycol | 207° C. | | | | | | | | | |
| Alkaline compound | Triethanolamine | — | | | | | | | | | |
| | Triisopropanolamine | — | | | | | | | | | |
| | Potassium hydroxide | — | | | | | | | | | |
| | Sodium hydroxide | — | | | | | | | | | |
| Surfactant | Orfin E1010 | — | 1.0% | 1.0% | 1.0% | 1.0% | 1.0% | 1.0% | 1.0% | 1.0% | 1.0% |
| Metal sealing agent | EDTA-2Na | — | 0.02% | 0.02% | 0.02% | 0.02% | 0.02% | 0.02% | 0.02% | 0.02% | 0.02% |
| Antibacterial agent | Proxel XL2 | — | 0.30% | 0.30% | 0.30% | 0.30% | 0.30% | 0.30% | 0.30% | 0.30% | 0.30% |
| Physical properties | Viscosity (mPa · s/20° C.) | | 4.0 | 4.0 | 4.0 | 4.0 | 4.0 | 4.0 | 4.0 | 4.0 | 4.0 |
| | pH(20° C.) | | 3.8 | 3.8 | 3.5 | 3.5 | 3.5 | 3.5 | 3.5 | 7.5 | 7.5 |
| Content ratio | b.p. 230° C. or lower/b.p. 250° C. or higher | | 1.0 | 1.0 | 1.0 | 1.0 | 1.0 | 1.0 | 1.0 | 1.0 | 1.0 |
| | b.p. 250° C. or higher/cationic polymer | | 50.0 | 30.0 | 15.0 | 4.0 | 2.5 | 1.2 | 0.8 | 7.0 | 7.0 |
| | Alkaline compound/cationic polymer | | 0.0 | 0.0 | 0.0 | 0.0 | 0.0 | 0.0 | 0.0 | 0.0 | 0.0 |
| | Cationic polymer/polyvalent metal salt | | 0.1 | 0.2 | 0.3 | 1.0 | 1.3 | 1.7 | 2.0 | 0.7 | 0.7 |
| Recoding condition | Used ink | | Bk | Bk | Bk | Bk | Bk | Bk | Bk | Bk | Bk |
| | Applying method of reaction solution | | IJ | IJ | IJ | IJ | IJ | IJ | IJ | IJ | IJ |
| Evaluation | Intermittent painting stability | | A | A | A | A | A | B | C | A | A |
| | Color developing properties | | A | A | A | A | A | A | A | A | A |
| | Bleeding | | A | A | A | A | A | A | A | A | A |
| | Wet friction fastness | | C | B | A | A | A | A | A | B | B |
| | Pitting corrosion | | Present | Present | Present | Present | Present | Present | Present | Present | Present |

| Water level | Content | Boiling point | Example 24 | Example 25 | Example 26 | Example 27 | Example 28 | Example 29 | Example 30 | Example 31 |
|---|---|---|---|---|---|---|---|---|---|---|
| Polyvalent metal salt | Magnesium chloride | — | | | | | | | | |
| | Magnesium sulfate | — | 3.0% | 3.0% | 3.0% | 3.0% | 3.0% | 3.0% | 3.0% | 3.0% |
| | Calcium chloride | — | | | | | | | | |
| Cationic polymer | Kymene 557 | — | | 2.0% | 2.0% | 2.0% | 2.0% | 2.0% | 2.0% | 2.0% |
| | Milliogen P-20 | — | | | | | | | | |
| | Unisense FPA 100L | — | | | | | | | | |
| | Unisense KHE 107L | — | 2.0% | | | | | | | |
| Moisturizing agent polyhydric alcohol | Glycerin | 290° C. | 14.0% | 28.0% | 23.0% | 18.0% | 13.0% | 8.0% | 5.0% | 1.0% |
| | Triethylene glycol | 287° C. | | | | | | | | |
| | Propylene glycol | 188° C. | 14.0% | | 5.0% | 10.0% | 15.0% | 20.0% | 23.0% | 27.0% |
| Polyandric alcohol | 1,3-butylene glycol | 207° C. | | | | | | | | |
| Alkaline compound | Triethanolamine | — | | | | | | | | |
| | Triisopropanolamine | — | | | | | | | | |
| | Potassium hydroxide | — | | | | | | | | |
| | Sodium hydroxide | — | | | | | | | | |
| Surfactant | Orfin E1010 | — | 1.0% | 1.0% | 1.0% | 1.0% | 1.0% | 1.0% | 1.0% | 1.0% |
| Metal sealing agent | EDTA-2Na | — | 0.02% | 0.02% | 0.02% | 0.02% | 0.02% | 0.02% | 0.02% | 0.02% |
| Antibacterial agent | Proxel XL2 | — | 0.30% | 0.30% | 0.30% | 0.30% | 0.30% | 0.30% | 0.30% | 0.30% |
| Physical properties | Viscosity (mPa · s/20° C.) | | 4.0 | 4.0 | 4.0 | 4.0 | 4.0 | 4.0 | 4.0 | 4.0 |
| | pH(20° C.) | | 4.0 | 3.8 | 3.8 | 3.8 | 3.8 | 3.8 | 3.8 | 3.8 |
| Content ratio | b.p. 230° C. or lower/b.p. 250° C. or higher | | 1.0 | 0.0 | 0.2 | 0.6 | 1.2 | 2.5 | 4.6 | 27.0 |
| | b.p. 250° C. or higher/cationic polymer | | 7.0 | 14.0 | 11.5 | 9.0 | 6.5 | 4.0 | 2.5 | 0.5 |

TABLE 2-continued

| | | | | | | | | | |
|---|---|---|---|---|---|---|---|---|---|
| | Alkaline compound/cationic polymer | 0.0 | 0.0 | 0.0 | 0.0 | 0.0 | 0.0 | 0.0 | 0.0 |
| | Cationic polymer/polyvalent metal salt | 0.7 | 0.7 | 0.7 | 0.7 | 0.7 | 0.7 | 0.7 | 0.7 |
| Recoding condition | Used ink | Bk | Bk | Bk | Bk | Bk | Bk | Bk | Bk |
| | Applying method of reaction solution | IJ | IJ | IJ | IJ | IJ | IJ | IJ | IJ |
| Evaluation | Intermittent painting stability | A | A | A | A | A | A | B | C |
| | Color developing properties | A | A | A | A | A | A | A | A |
| | Bleeding | A | A | A | A | A | A | A | A |
| | Wet friction fastness | B | C | B | A | A | A | A | A |
| | Pitting corrosion | Present | Present | Present | Present | Present | Present | Present | Present |

TABLE 3

| Water level | Content | Boiling point | Example 32 | Example 33 | Example 34 | Example 35 | Example 36 | Comparative Example 1 |
|---|---|---|---|---|---|---|---|---|
| Polyvalent metal | Magnesium chloride | — | | | | | | |
| | Magnesium sulfate | — | 3.0% | 3.0% | 3.0% | 3.0% | 3.0% | 1.0% |
| | Calcium chloride | — | | | | | | |
| Cationic polymer | Kymene 557 | — | 2.0% | 2.0% | 2.0% | 2.0% | 2.0% | |
| | Milliogen P-20 | — | | | | | | |
| | Unisense FPA 100L | — | | | | | | |
| | Unisense KHE 107L | — | | | | | | |
| Moisturizing agent polyhydric alcohol | Glycerin | 290° C. | 14.0% | 5.0% | 7.0% | 18.0% | 18.0% | 15.0% |
| | Triethylene glycol | 287° C. | 14.0% | | | | | |
| | Propylene glycol | 188° C. | | 5.0% | 7.0% | 16.0% | 18.0% | 15.0% |
| Polyandric alcohol | 1,3-butylene glycol | 207° C. | | | | | | |
| Alkaline compound | Triethanolamine | — | | | | | | |
| | Triisopropanolamine | — | | | | | | |
| | Potassium hydroxide | — | | | | | | |
| | Sodium hydroxide | — | | | | | | |
| Surfactant | Orfin E1010 | — | 1.0% | 1.0% | 1.0% | 1.0% | 1.0% | 1.0% |
| Metal sealing agent | EDTA-2Na | — | 0.02% | 0.02% | 0.02% | 0.02% | 0.02% | 0.02% |
| Antibacterial agent | Proxel XL2 | — | 0.30% | 0.30% | 0.30% | 0.30% | 0.30% | 0.30% |
| Physical properties | Viscosity (mPa · s/20° C.) | | 4.0 | 2.5 | 3.0 | 4.8 | 5.6 | 3.7 |
| | pH(20° C.) | | 3.8 | 3.5 | 3.5 | 3.5 | 3.5 | 7.3 |
| Content ratio | b.p. 230° C. or lower/b.p. 250° C. or higher | | 0.0 | 1.0 | 1.0 | 1.0 | 1.0 | 1.0 |
| | b.p. 250° C. or higher/cationic polymer | | 14.0 | 2.5 | 3.5 | 8.0 | 9.0 | — |
| | Alkaline compound/cationic polymer | | 0.0 | 0.0 | 0.0 | 0.0 | 0.0 | — |
| | Cationic polymer/polyvalent metal salt | | 0.7 | 0.7 | 0.7 | 0.7 | 0.7 | 0.0 |
| Recoding condition | Used ink | | Bk | Bk | Bk | Bk | Bk | Bk |
| | Applying method of reaction solution | | IJ | IJ | IJ | IJ | IJ | IJ |
| Evaluation | Intermittent painting stability | | A | B | A | A | A | A |
| | Color developing properties | | A | A | A | A | A | B |
| | Bleeding | | A | A | A | A | B | C |
| | Wet friction fastness | | C | A | A | A | B | D |
| | Pitting corrosion | | Present | Present | Present | Present | Present | Absent |

| Water level | Content | Boiling point | Comparative Example 2 | Comparative Example 3 | Comparative Example 4 | Comparative Example 5 | Comparative Example 6 |
|---|---|---|---|---|---|---|---|
| Polyvalent metal | Magnesium chloride | — | | | | 1.0% | 2.0% |
| | Magnesium sulfate | — | 2.0% | 3.0% | 4.0% | | |
| | Calcium chloride | — | | | | | |
| Cationic polymer | Kymene 557 | — | | | | | |
| | Milliogen P-20 | — | | | | | |
| | Unisense FPA 100L | — | | | | | |
| | Unisense KHE 107L | — | | | | | |
| Moisturizing agent polyhydric alcohol | Glycerin | 290° C. | 15.0% | 15.0% | 15.0% | 15.0% | 15.0% |
| | Triethylene glycol | 287° C. | | | | | |
| | Propylene glycol | 188° C. | 15.0% | 15.0% | 15.0% | 15.0% | 15.0% |
| Polyandric alcohol | 1,3-butylene glycol | 207° C. | | | | | |
| Alkaline compound | Triethanolamine | — | | | | | |
| | Triisopropanolamine | — | | | | | |
| | Potassium hydroxide | — | | | | | |
| | Sodium hydroxide | — | | | | | |
| Surfactant | Orfin E1010 | — | 1.0% | 1.0% | 1.0% | 1.0% | 1.0% |
| Metal sealing agent | EDTA-2Na | — | 0.02% | 0.02% | 0.02% | 0.02% | 0.02% |
| Antibacterial agent | Proxel XL2 | — | 0.30% | 0.30% | 0.30% | 0.30% | 0.30% |
| Physical properties | Viscosity (mPa · s/20° C.) | | 3.7 | 3.8 | 3.8 | 3.7 | 3.7 |
| | pH(20° C.) | | 7.3 | 7.3 | 7.3 | 7.3 | 7.3 |
| Content ratio | b.p. 230° C. or lower/b.p. 250° C. or higher | | 1.0 | 1.0 | 1.0 | 1.0 | 1.0 |
| | b.p. 250° C. or higher/cationic polymer | | — | — | — | — | — |
| | Alkaline compound/cationic polymer | | — | — | — | — | — |

TABLE 3-continued

|  |  |  | | | | | |
|---|---|---|---|---|---|---|---|
| Recoding condition | Cationic polymer/polyvalent metal salt | | 0.0 | 0.0 | 0.0 | 0.0 | 0.0 |
|  | Used ink | | Bk | Bk | Bk | Bk | Bk |
|  | Applying method of reaction solution | | IJ | IJ | IJ | IJ | IJ |
| Evaluation | Intermittent painting stability | | A | A | A | A | A |
|  | Color developing properties | | A | A | A | B | A |
|  | Bleeding | | B | B | B | C | B |
|  | Wet friction fastness | | D | D | D | D | D |
|  | Pitting corrosion | | Absent | Absent | Absent | Present | Present |

| Water level | Content | Boiling point | Comparative Example 7 | Comparative Example 8 | Comparative Example 9 | Comparative Example 10 | Comparative Example 11 |
|---|---|---|---|---|---|---|---|
| Polyvalent metal | Magnesium chloride | — | 3.0% | 4.0% | | | |
|  | Magnesium sulfate | — | | | | 3.0% | 2.0% |
|  | Calcium chloride | — | | | | | |
| Cationic polymer | Kymene 557 | — | | | 2.0% | 2.0% | 2.0% |
|  | Milliogen P-20 | — | | | | | |
|  | Unisense FPA 100L | — | | | | | |
|  | Unisense KHE 107L | — | | | | | |
| Moisturizing agent polyhydric alcohol | Glycerin | 290° C. | 15.0% | 15.0% | 14.0% | 14.0% | |
|  | Triethylene glycol | 287° C. | | | | | |
|  | Propylene glycol | 188° C. | 15.0% | 15.0% | 14.0% | 14.0% | 14.0% |
| Polyandric alcohol | 1,3-butylene glycol | 207° C. | | | | | 14.0% |
| Alkaline compound | Triethanolamine | — | | | | | |
|  | Triisopropanolamine | — | | | | | |
|  | Potassium hydroxide | — | | | | | |
|  | Sodium hydroxide | — | | | | | |
| Surfactant | Orfin E1010 | — | 1.0% | 1.0% | 1.0% | 1.0% | 1.0% |
| Metal sealing agent | EDTA-2Na | — | 0.02% | 0.02% | 0.02% | 0.02% | 0.02% |
| Antibacterial agent | Proxel XL2 | — | 0.30% | 0.30% | 0.30% | 0.30% | 0.30% |
| Physical properties | Viscosity (mPa · s/20° C.) | | 3.8 | 3.8 | 3.7 | 4.0 | 4.0 |
|  | pH(20° C.) | | 7.3 | 7.3 | 3.8 | 3.8 | 3.8 |
| Content ratio | b.p. 230° C. or lower/b.p. 250° C. or higher | | 1.0 | 1.0 | 1.0 | 1.0 | — |
|  | b.p. 250° C. or higher/cationic polymer | | — | — | 7.0 | 7.0 | 0.0 |
|  | Alkaline compound/cationic polymer | | — | — | 0.0 | 0.0 | 0.0 |
|  | Cationic polymer/polyvalent metal salt | | 0.0 | 0.0 | — | 0.7 | 0.7 |
| Recoding condition | Used ink | | Bk | Bk | Bk | Bk | Bk |
|  | Applying method of reaction solution | | IJ | IJ | IJ | Spray | IJ |
| Evaluation | Intermittent painting stability | | A | A | A | — | D |
|  | Color developing properties | | A | A | D | D | A |
|  | Bleeding | | B | B | C | C | A |
|  | Wet friction fastness | | D | D | A | D | A |
|  | Pitting corrosion | | Present | Present | Present | Present | Present |

The descriptions of Tables 1 to 3 above are supplemented as follows.
Reaction Solution Composition
Cationic Polymer
Kymene 557 (product name manufactured by SOLENIS, epichlorohydrin-based resin)
Milliogen P-20 (product name manufactured by Senka Co., Ltd., quaternary salt of alkylamine/epichlorohydrin adduct)
Unisense FPA 100L (product name manufactured by Senka Co., Ltd., quaternary salt of alkylamine/allylamine adduct)
Unisense KHE 107L (product name manufactured by Senka Co., Ltd., quaternary salt of alkylamine/epichlorohydrin adduct)
Polyhydric Alcohol
1,3-butylene glycol (penetration solvent)
Others
Orfin E1010 (product name manufactured by Nissin Chemical Industry Co., Ltd., acetylene glycol-based surfactant)
EDTA-2Na (ethylenediamine tetraacetate dihydrogen disodium salt)
Proxel XL2 (product name manufactured by Ronza Japan Co., Ltd.)

Terminology

"Boiling point": indicates a standard boiling point
"b. p. 230° C. or lower/b.p. 250° C. or higher": content of polyhydric alcohol having a standard boiling point of 230° C. or lower/content of polyhydric alcohol having a standard boiling point of 250° C. or higher
"b. p. 250° C. or higher/cationic polymer": content of polyhydric alcohol having a standard boiling point of 250° C. or higher/content of cationic polymer
"Bk": ink having the composition shown in Table 4 below.
"IJ": coating using an ink jet method A viscosity was measured using a viscoelastic tester (MCR-300, manufactured by Pysica). In addition, a pH was measured using a desktop pH meter (model number: F-72, manufacturer: manufactured by HORIBA). A temperature at which the viscosity and the pH were measured was set to 20° C.

4.2. Preparation of Printing Ink Jet Ink Composition

Each component was put in a container so as to have a composition shown in Table 4 below, components were mixed and stirred using a magnetic stirrer for 2 hours, and then the mixture was sufficiently mixed by performing a dispersion treatment in a bead mill filled with zirconia beads having a diameter of 0.3 mm. The mixture was filtered using a 5 μm PTFE membrane filter while stirring for 1 hour to obtain an ink composition. Pure water was added so that the total amount of the ink composition was 100% by mass.

With the pigment, a pigment dispersant solution was prepared in advance by mixing a pigment dispersant, which is a styrene/acrylic water-soluble resin not described in the table, and the pigment with water at a mass ratio of pigment:pigment dispersant=2:1 and stirred, and the pigment dispersant solution was used for preparing ink.

TABLE 4

| | | | Bk |
|---|---|---|---|
| Ink composition (mass % concentration) | Resin particles | UW-1527F (product name manufactured by UBE Corporation, urethane resin) | 6.0 |
| | Pigment | Carbon black | 5.0 |
| | Other solvents | Glycerin | 14.0 |
| | | TEG (Triethylene glycol) | 4.5 |
| | | BTG (Triethylene glycol monobutyl ether) | 1 |
| | | Orfin E1010 (product name manufactured by Nissin Chemical Industry Co., Ltd., acetylene glycol-based surfactant) | 0.5 |
| | | TEA (Triethanolamine) | 1 |
| | | Pure water | Residue |

4.3 Preparation of Printed Matter

Using an apparatus modified from PX-H8000 (manufactured by Seiko Epson Corporation), printing was performed on a medium to be recorded of 100% cotton white broad under the conditions described in Tables 1 to 3 above, and main scanning was performed on the same scanning region a plurality of times (4 times) to form a solid pattern image on an A4 size fabric which is the medium to be recorded. Then, the fabric was heat-treated at 160° C. for 3 minutes in an oven and dried to prepare a printed matter according to each Example and each Comparative Example. As the ink jet head, a head unit having a distance between nozzles of 600 dpi in a width direction of the medium to be recorded and 600 nozzles was used. The nozzle group for reaction solution and the nozzle group for ink composition have portions at the same position in the sub-scanning direction, and the ones with the heads disposed in FIG. 3 were used. With this, the reaction solution and the ink composition were adhered to the same scanning region of the fabric by the same main scanning. In addition, the time difference between the adhesion of the ink and the adhesion of the reaction solution was within 5 seconds.

In addition, the "solid pattern image" means an image in which dots are recorded for all pixels of the pixel which is the minimum recording unit region defined by a recording resolution (Duty 100%).

4.4. Evaluation Method

4.4.1 Intermittent Printing Stability

An apparatus modified from PX-H8000 (manufactured by Seiko Epson Corporation) was filled with each reaction solution for pigment printing obtained above, and after idling for 3 minutes, the number of missing nozzles was counted by a nozzle check pattern to evaluate intermittent printing stability according to the following criteria. When the evaluation result is C or higher, it can be said that favorable intermittent printing stability is obtained.

Evaluation Criteria

A: The number of non-ejection nozzles is less than 4
B: The number of non-ejection nozzles is 4 or more and less than 7
C: The number of non-ejection nozzles is 7 or more and less than 11
D: The number of non-ejection nozzles is 11 or more

4.4.2 Color Developing Properties

An OD value of black of the obtained printed matter was measured using a fluorescence spectrophotometer ("FD-7", manufactured by Konica Minolta Inc.) to evaluate color developing properties according to the following criteria. When the evaluation result is B or higher, it can be said that favorable color development is obtained.

Evaluation Criteria

A: OD value is 1.45 or more
B: OD value is 1.40 or more and less than 1.45
C: OD value is 1.35 or more and less than 1.40
D: OD value is less than 1.35

4.4.3 Bleeding

For the evaluation of bleeding, the same printed matter as that used in the following "wet friction fastness" test was used. Aggregation unevenness of the ink in the solid pattern of the printed matter was visually observed and evaluated according to the following evaluation criteria.

Evaluation Criteria

A: Aggregation unevenness was not observed in the solid pattern.
B: Some aggregation unevenness was observed in the solid pattern.
C: Aggregation unevenness was observed in the solid pattern as a whole.

4.4.4 Wet Friction Fastness

The friction fastness of the printed matter obtained above was tested by a test method based on ISO105-X12, and wet friction fastness was evaluated according to the following criteria. When the evaluation result is C or higher, it can be said that favorable friction fastness is obtained.

Evaluation Criteria

A: Friction fastness is grade 3 or higher
B: Friction fastness is grade 2 to 3 or higher and lower than grade 3
C: Friction fastness is grade 2 or higher and lower than grade 2 to 3
D: Friction fastness is lower than grade 2

4.4.5 Pitting Corrosion

A general-purpose SUS430 for an ink jet head was immersed in each of the reaction solution for pigment printing obtained above and allowed to stand for 2 days in an environment of 60° C., and it was confirmed whether pitting corrosion occurred or not. It was possible to use the printer even when there was pitting corrosion.

Evaluation Criteria

Present: Pitting corrosion exists
Absent: No pitting corrosion exists 4.5. Evaluation Results The evaluation results are shown in Tables 1 to 3 above.

From Tables 1 to 3 above, in each example using a reaction solution for pigment printing, which contains a polyvalent metal salt, a cationic polymer, a polyhydric alcohol having a standard boiling point of 250° C. or higher, and water and is used by being ejected by an ink jet method, all of these were excellent in color developing properties, friction fastness, and intermittent printing stability.

From comparison between Examples 4, 17, and the like and Comparative Examples 1 to 9, by using a polyvalent metal salt and a cationic polymer in combination, it was possible to make friction fastness and color developing properties favorable.

From comparison between Example 4 and Comparative Example 10, by using the reaction solution by being ejected by an ink jet method, it was possible to make friction fastness and color developing properties favorable.

From comparison between Example 4 and Comparative Example 11, by containing a polyhydric alcohol having a standard boiling point of 250° C. or higher, it was possible to make intermittent printing stability favorable.

From the results of Examples 1 to 6, the polyvalent metal salt became favorable in color developing properties, bleeding, and wet friction fastness in a wide content range.

From the results of Examples 4 and 7, by containing an alkaline compound, it was possible to reduce pitting corrosion.

From the results of Examples 4 and 8 to 11, it was possible for the alkaline compound to obtain favorable wet friction fastness and to reduce pitting corrosion in a wide content range.

From the results of Examples 4, 8, 12, and 13, it was possible to reduce pitting corrosion in various alkaline compounds.

From the results of Examples 4 and 14, when the polyvalent metal salt was a magnesium salt, wet friction fastness was more excellent.

From the results of Examples 4 and 15 to 21, the cationic polymer was favorable in intermittent printing stability and wet friction fastness in a wide content range.

From the results of Examples 4 and 22 to 24, wet friction fastness was favorable in various cationic polymers.

From the results of Examples 4 and 25 to 31, when a ratio of a content of a polyhydric alcohol having a standard boiling point of 230° C. or lower to a content of the polyhydric alcohol having a standard boiling point of 250° C. or higher is within a predetermined range, it was possible to make wet friction fastness and intermittent printing stability favorable.

From the results of Examples 4 and 32, when a polyhydric alcohol having a standard boiling point of 230° C. or lower was contained, wet friction fastness became favorable.

From the results of Examples 4 and 33 to 36, it was possible to obtain favorable intermittent printing stability, bleeding, and wet friction fastness in a wide content range of the polyhydric alcohol.

The following contents are derived from the above-mentioned embodiment.

An aspect of the reaction solution for pigment printing includes
    a polyvalent metal salt;
    a cationic polymer;
    a polyhydric alcohol having a standard boiling point of 250° C. or higher; and water, and
is used by being ejected by an ink jet method.

In an aspect of the above-mentioned reaction solution for pigment printing,
    the cationic polymer may have a structure derived from epihalohydrin.

In any aspect of the above-mentioned reaction solution for pigment printing,
    a content of the cationic polymer may be 0.5% to 5.0% by mass with respect to the total amount of the reaction solution.

In any aspect of the above-mentioned reaction solution for pigment printing,
    the polyvalent metal salt may be a magnesium salt.

In any aspect of the above-mentioned reaction solution for pigment printing,
    in addition, a polyhydric alcohol having a standard boiling point of 230° C. or lower may be contained.

In any aspect of the above-mentioned reaction solution for pigment printing,
    a content of the polyhydric alcohol having a standard boiling point of 250° C. or higher may be 3% by mass or more with respect to the total amount of the reaction solution.

In any aspect of the above-mentioned reaction solution for pigment printing,
    when the content of the polyhydric alcohol having a standard boiling point of 250° C. or higher with respect to the total amount of the reaction solution is set as $M_1$, and the content of the polyhydric alcohol having a standard boiling point of 230° C. or lower with respect to the total amount of the reaction solution is set as $M_2$, a content ratio ($M_2/M_1$) may be 0.1 to 30.0.

In any aspect of the above-mentioned reaction solution for pigment printing,
    when the content of the polyhydric alcohol having a standard boiling point of 250° C. or higher with respect to the total amount of the reaction solution is set as $M_1$ and the content of the cationic polymer with respect to the total amount of the reaction solution is set as $M_3$, a content ratio ($M_1/M_3$) may be 0.5 to 50.0.

In any aspect of the above-mentioned reaction solution for pigment printing,
    when the content of the cationic polymer with respect to the total amount of the reaction solution is set as $M_3$ and the content of the polyvalent metal salt with respect to the total amount of the reaction solution is set as $M_4$, a content ratio ($M_3/M_4$) may be 0.1 to 4.0.

In any aspect of the above-mentioned reaction solution for pigment printing,
    a viscosity of the reaction solution for pigment printing may be 2 to 10 mPa·s.

In any aspect of the above-mentioned reaction solution for pigment printing,
    a pH of the reaction solution for pigment printing may be 4.5 or higher.

In any aspect of the above-mentioned reaction solution for pigment printing,
    an alkaline compound is further contained, and when a content of the alkaline compound with respect to the total amount of the reaction solution is set as $M_5$ and the content of the cationic polymer with respect to the total amount of the reaction solution is set as $M_3$, a content ratio ($M_5/M_3$) may be 0.1 to 1.0.

An aspect of the ink set includes a printing ink jet ink composition containing a pigment, resin particles, and water; and a reaction solution for pigment printing according to any one of the aspects.

An aspect of the recording method includes an ink adhering step of adhering an ink composition to a fabric by an ink jet method; and a reaction solution adhering step of adhering a reaction solution for pigment printing according to any one of the aspects on the fabric by an ink jet method.

In an aspect of the recording method, a time difference between the ink adhering step and the reaction solution adhering step may be within 5 seconds.

In any aspect of the recording method, in the ink jet method, main scanning is performed a plurality of times for recording by moving an ink jet head in a direction perpendicular to a transport direction of the fabric, the reaction solution for pigment printing and the ink composition are adhered to the same scanning region of the fabric by the same main scanning, and the same main scanning may be performed a plurality of times with respect to the same scanning region.

The present disclosure is not limited to the above-mentioned embodiment, and various modifications can be done. For example, the present disclosure includes a configuration substantially the same as the configuration described in the embodiment, for example, a configuration having the same function, method, and effect, or a configuration having the same object and effect. In addition, the present disclosure also includes a configuration in which a non-essential part of the configuration described in the embodiment is replaced. In addition, the present disclosure includes a configuration that exhibits the same effects as the configuration described in the embodiment or a configuration that can achieve the same object. In addition, the present disclosure includes a configuration in which a known technique is added to the configuration described in the embodiment.

What is claimed is:

1. A reaction solution for pigment printing, comprising:
a polyvalent metal salt;
a cationic polymer;
a polyhydric alcohol having a standard boiling point of 250° C. or higher;
a polyhydric alcohol having a standard boiling point of 230° C. or lower; and
water, wherein
the reaction solution for pigment printing is used by being ejected by an ink jet method; and
a content of the polhydric alcohol having a standard boiling point of 250° C. or higher with respect to the total amount of the reaction solution is denoted as $M_1$,
a content of the polyhydric alcohol having a standard boiling point of 230° C. or lower with respect to the total amount of the reaction solution is denoted as $M_2$, and a content ratio ($M_2/M_1$) is 01 to 30.0.

2. The reaction solution for pigment printing according to claim 1, wherein
the cationic polymer has a structure derived from epihalohydrin.

3. The reaction solution for pigment printing according to claim 1, wherein
a content of the cationic polymer is 0.5% to 5.0% by mass with respect to a total amount of the reaction solution.

4. The reaction solution for pigment printing according to claim 1, wherein
the polyvalent metal salt is a magnesium salt.

5. The reaction solution for pigment printing according to claim 1, wherein
a content of the polyhydric alcohol having a standard boiling point of 250° C. or higher is 3% by mass or more with respect to a total amount of the reaction solution.

6. The reaction solution for pigment printing according to claim 1, wherein,
when the content of the polyhydric alcohol having a standard boiling point of 250° C. or higher with respect to the total amount of the reaction solution is denoted as $M_1$ and a content of the cationic polymer with respect to the total amount of the reaction solution is denoted as $M_3$, a content ratio ($M_1/M_3$) is 0.5 to 50.0.

7. The reaction solution for pigment printing according to claim 1, wherein,
when the content of the cationic polymer with respect to the total amount of the reaction solution is denoted as $M_3$, and a content of the polyvalent metal salt with respect to the total amount of the reaction solution is denoted as $M_4$, a content ratio ($M_3/M_4$) is 0.1 to 4.0.

8. The reaction solution for pigment printing according to claim 1, wherein
a viscosity of the reaction solution for pigment printing is 2 to 10 mPa·s.

9. The reaction solution for pigment printing according to claim 1, wherein
a pH of the reaction solution for pigment printing is 4.5 or higher.

10. The reaction solution for pigment printing according to claim 1, further comprising:
an alkaline compound, wherein,
when a content of the alkaline compound with respect to the total amount of the reaction solution is denoted as $M_5$, and the content of the cationic polymer with respect to the total amount of the reaction solution is denoted as $M_3$, a content ratio ($M_5/M_3$) is 0.1 to 1.0.

11. An ink set comprising:
a printing ink jet ink composition containing a pigment, resin particles, and water; and
the reaction solution for pigment printing according to claim 1.

12. A recording method comprising:
an ink adhering step of adhering an ink composition to a fabric by an ink jet method; and
a reaction solution adhering step of adhering the reaction solution for pigment printing according to claim 1 to the fabric by an ink jet method.

13. The recording method according to claim 12, wherein
a time difference between the ink adhering step and the reaction solution adhering step is within 5 seconds.

14. The recording method according to claim 12, wherein,
in the ink jet method, an ink jet head is moved in a direction perpendicular to a transport direction of the fabric to perform recording and main scanning is performed a plurality of times,
the reaction solution for pigment printing and the ink composition are adhered to the same scanning region of the fabric by the same main scanning, and the same main scanning is performed a plurality of times with respect to the same scanning region.

* * * * *